(12) United States Patent
Gao et al.

(10) Patent No.: US 12,322,991 B2
(45) Date of Patent: Jun. 3, 2025

(54) BATTERY PACK AND AN ADAPTER WITH A VOLTAGE CONVERSION CIRCUIT

(71) Applicant: Nanjing Chervon Industry Co., Ltd., Nanjing (CN)

(72) Inventors: Qing Gao, Nanjing (CN); Hong Zhu, Nanjing (CN); Zhijian Lu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 729 days.

(21) Appl. No.: 17/549,230

(22) Filed: Dec. 13, 2021

(65) Prior Publication Data

US 2022/0102997 A1 Mar. 31, 2022

Related U.S. Application Data

(63) Continuation of application No. PCT/CN2020/136005, filed on Dec. 14, 2020, and a
(Continued)

(30) Foreign Application Priority Data

Jun. 14, 2019 (CN) .......................... 201910518043.1
Oct. 30, 2019 (CN) .......................... 201911047627.1
Jan. 23, 2020 (CN) .......................... 202010076760.6

(51) Int. Cl.
*H02J 7/00* (2006.01)
*H02J 7/02* (2016.01)

(52) U.S. Cl.
CPC ........ *H02J 7/0068* (2013.01); *H02J 7/00036* (2020.01); *H02J 7/00712* (2020.01); *H02J 7/02* (2013.01)

(58) Field of Classification Search
CPC ...................................................... H02J 7/0068
(Continued)

(56) References Cited

U.S. PATENT DOCUMENTS 6,191,498 B1 2/2001 Chang
2004/0155627 A1 8/2004 Stanesti
(Continued)

FOREIGN PATENT DOCUMENTS

CN 201559182 U 8/2010
CN 101929607 A 12/2010
(Continued)

OTHER PUBLICATIONS

ISA/CN, International search report issued on PCT application No. PCT/CN2019/126426, dated Mar. 24, 2020, 3 pages.
(Continued)

*Primary Examiner* — Yalkew Fantu
(74) *Attorney, Agent, or Firm* — Greenberg Traurig, LLP

(57) ABSTRACT

A combination includes a battery pack and an adapter. The battery pack includes a battery pack interface at least capable of being detachably connected to a power tool. A first adapter includes a plug, an alternating current input interface, an alternating current-direct current conversion circuit, and a direct current output interface. A second adapter is capable of being electrically connected to the first adapter and the battery pack. The second adapter includes an adapter interface, a direct current interface, a voltage conversion circuit, and a two-way control module. The direct current interface is configured to be detachably electrically connected to the direct current output interface. The voltage conversion circuit is connected in series between the direct current interface and the adapter interface. The two-way
(Continued)

control module is connected between the direct current interface and the adapter interface and connected to the voltage conversion circuit.

20 Claims, 25 Drawing Sheets

Related U.S. Application Data continuation of application No. PCT/CN2019/126426, filed on Dec. 18, 2019.

(58) Field of Classification Search
USPC .......................................................... 320/128
See application file for complete search history.

(56) References Cited

U.S. PATENT DOCUMENTS

| | | | |
|---|---|---|---|
| 2005/0168194 A1 | 8/2005 | Stanesti | |
| 2008/0018303 A1 | 1/2008 | Scheucher | |
| 2009/0200982 A1 | 8/2009 | Hurtz | |
| 2010/0181966 A1 | 7/2010 | Sakakibara | |
| 2011/0012560 A1 | 1/2011 | Sakakibara | |
| 2012/0104992 A1* | 5/2012 | Suzuki | H01M 50/213 320/103 |
| 2014/0097692 A1 | 4/2014 | Yang | |
| 2014/0117922 A1 | 5/2014 | Pham | |
| 2015/0171632 A1 | 6/2015 | Fry et al. | |
| 2016/0026111 A1 | 9/2016 | Po-Yuan | |
| 2018/0159348 A1 | 6/2018 | Chang | |
| 2018/0198294 A1* | 7/2018 | Sheeks | H02J 7/007194 |
| 2018/0323641 A1 | 11/2018 | Lee et al. | |
| 2019/0103805 A1* | 4/2019 | Zhu | H02J 7/0063 |

FOREIGN PATENT DOCUMENTS

| | | |
|---|---|---|
| CN | 204131178 U | 1/2015 |
| CN | 104613402 A | 5/2015 |
| CN | 204497813 U | 7/2015 |
| CN | 204597589 U | 8/2015 |
| CN | 205304290 U | 6/2016 |
| CN | 107150315 A | 9/2017 |
| CN | 107394833 A | 11/2017 |
| CN | 208890421 U | 5/2019 |
| CN | 110649680 A | 1/2020 |
| WO | 2017/167210 A1 | 10/2017 |

OTHER PUBLICATIONS

ISA/CN, English translation of International search report issued on PCT application No. PCT/CN2019/126426, dated Mar. 24, 2020, 2 pages.
ISA/CN, International search report issued on PCT application No. PCT/CN2020/136005, dated Mar. 11, 2021, 3 pages.
ISA/CN, English translation of International search report issued on PCT application No. PCT/CN2020/136005, dated Mar. 11, 2021, 2 pages.
EPO, extended European search report issued on EP publication No. 3972072, dated Jun. 24, 2022, 5 pages.
EPO, extended European search report issued on European patent application No. 20915320.4, dated Sep. 29, 2022, 7 pages.

* cited by examiner

BATTERY PACK AND AN ADAPTER WITH A VOLTAGE CONVERSION CIRCUIT

RELATED APPLICATION INFORMATION

This application is a continuation of International Application Number PCT/CN2019/126426, filed on Dec. 18, 2019, through which this application also claims the benefit under 35 U.S.C. § 119(a) of Chinese Patent Application No. 201910518043.1, filed on Jun. 14, 2019 and Chinese Patent Application No. 201911047627.1, filed on Oct. 30, 2019.

This application is also a continuation of International Application Number PCT/CN2020/136005, filed on Dec. 14, 2020, through which this application also claims the benefit under 35 U.S.C. § 119(a) of Chinese Patent Application No. 202010076760.6, filed on Jan. 23, 2020.

All of these applications from which benefit is claimed are incorporated herein by reference in their entirety.

BACKGROUND

With the development of power tools, portable power tools have been increasingly used in different fields such as industry, construction, and garden machinery. People have higher requirements for the portable power tools.

In the related art, a battery pack is often used for supplying power to a power tool. The battery pack can only be adapted to the power tool, but cannot be adapted to the power supply of an external electronic device, which limits usage scenarios of the battery pack.

In addition, the power tool in the related art needs to be equipped with a special charger for charging the battery pack, and the charger in the related art has a relatively complicated structure and relatively high manufacturing costs and is bulky and inconvenient to carry.

SUMMARY

The present application provides an adapter and a combination of a battery pack and an adapter, which have relatively low costs, are convenient to carry, and can expand usage scenarios of a battery pack of a power tool.

An example provides a combination of a battery pack and an adapter. The combination of a battery pack and an adapter includes the battery pack. The battery pack includes a battery pack interface at least capable of being detachably connected to a power tool. A first adapter includes a plug, an alternating current input interface, an alternating current-direct current conversion circuit, and a direct current output interface. The plug is used for access to an alternating current. The alternating current input interface is electrically connected to the plug. The alternating current-direct current conversion circuit is electrically connected to the alternating current input interface and configured to convert the alternating current into a direct current. The direct current output interface is electrically connected to the alternating current-direct current conversion circuit and configured to output the direct current. A second adapter is capable of being electrically connected to the first adapter and the battery pack and charging the battery pack with a charging power greater than 10 W. The second adapter includes an adapter interface, a direct current interface, a voltage conversion circuit, and a two-way control module. The adapter interface is configured to be detachably connected to the battery pack interface. The direct current interface is configured to be detachably electrically connected to the direct current output interface. The voltage conversion circuit is connected in series between the direct current interface and the adapter interface and configured to convert the direct current into an electric power output adapted to the battery pack. The two-way control module is connected between the direct current interface and the adapter interface and connected to the voltage conversion circuit, where the two-way control module is configured to be capable of controlling a current direction and an output voltage of the voltage conversion circuit according to a signal state of the direct current interface and a signal state of the adapter interface.

An example provides an adapter. The adapter includes an adapter interface and a direct current interface. The adapter interface is configured to be connected to a battery pack capable of being detachably connected to a power tool. The direct current is configured to be capable of being selectively connected to an external power consumption device or an external power supply device, where an output or input power of the direct current interface is greater than 10 W. The adapter further includes a voltage conversion circuit, a communication module, and a two-way control module. The voltage conversion circuit is connected in series between the direct current interface and the adapter interface, where the voltage conversion circuit is configured to convert electric power of the external power supply device into an electric power output adapted to the battery pack; and the voltage conversion circuit is configured to convert electric power of the battery pack into an electric power output adapted to the external power consumption device. The communication module is configured to be capable of sending a control signal to the two-way control module according to a signal state of the direct current interface. The two-way control module is connected between the direct current interface and the adapter interface and connected to the voltage conversion circuit, where the two-way control module is configured to control a current direction and an output voltage of the voltage conversion circuit according to the signal state of the direct current interface and a signal state of the adapter interface to selectively make the external power supply device charge the battery pack or make the battery pack discharged to supply power to the external power consumption device.

An example provides a combination of a battery pack and an adapter. The combination of a battery pack and an adapter includes the battery pack. The battery pack includes a battery pack interface at least capable of being detachably connected to a power tool. A first adapter includes a first plug, a first alternating current input interface, a first alternating current-direct current conversion circuit, and a first direct current output interface. The first plug is used for access to an alternating current. The first alternating current input interface is electrically connected to the first plug. The first alternating current-direct current conversion circuit is electrically connected to the first alternating current input interface and configured to convert the alternating current into a direct current. The first direct current output interface is electrically connected to the first alternating current-direct current conversion circuit and configured to output the direct current. A second adapter includes a second plug, a second alternating current input interface, a second alternating current-direct current conversion circuit, and a second direct current output interface. The second plug is used for access to the alternating current. The second alternating current input interface is electrically connected to the second plug. The second alternating current-direct current conversion circuit is electrically connected to the second alternating current input interface and configured to convert the alternating current into the direct current. The second direct current output interface is electrically connected to the second alternating current-direct current conversion circuit and configured to output the direct current. A third adapter is capable of being electrically connected to the first adapter, the second adapter, and the battery pack. The third adapter includes an adapter interface, a first direct current interface, a second direct current interface, a first voltage conversion circuit, a second voltage conversion circuit, and a two-way control module. The adapter interface is configured to be detachably connected to the battery pack interface. The first direct current interface is configured to be detachably electrically connected to the first direct current output interface, where an output or input power of the first direct current interface is greater than 10 W. The second direct current interface is configured to be detachably electrically connected to the second direct current output interface, where an output or input power of the second direct current interface is greater than 10 W. The first voltage conversion circuit is connected in series between the first direct current interface and the adapter interface and configured to convert a direct current of the first direct current output interface into an electric power output adapted to the battery pack. The second voltage conversion circuit is connected in series between the second direct current interface and the adapter interface and configured to convert a direct current of the second direct current output interface into the electric power output adapted to the battery pack. The two-way control module is connected between the first direct current interface or the second direct current interface, and the adapter interface and connected to the first voltage conversion circuit and the second voltage conversion circuit, where the two-way control module is configured to control a current direction and an output voltage of the first voltage conversion circuit according to a signal state of the first direct current interface and a signal state of the adapter interface; and the two-way control module is further configured to control a current direction and an output voltage of the second voltage conversion circuit according to a signal state of the second direct current interface and the signal state of the adapter interface. In the case where both the first alternating current input interface and the second alternating current input interface are connected to the alternating current, the battery pack is charged through the first direct current interface and the second direct current interface; a value range of a charging power of the first direct current interface is greater than 10 W; and a value range of a charging power of the second direct current interface is greater than 10 W.

An example provides an adapter. The adapter includes an adapter interface, a first direct current interface, a second direct current interface, a first voltage conversion circuit, and a two-way control module. The adapter interface is configured to be connected to a battery pack capable of being detachably connected to a power tool. The first direct current interface is configured to be capable of being electrically connected to an external power supply device, where an input power of the first direct current interface is greater than 10 W; and an input voltage range of the first direct current interface is 5 V to 20 V. The second direct current interface is capable of being electrically connected to an external power consumption device and configured to supply electric power of the external power supply device or electric power of the battery pack to the external power consumption device. The first voltage conversion circuit is connected in series between the first direct current interface and the adapter interface and configured to convert the electric power of the external power supply device into an electric power output adapted to the battery pack. The two-way control module is connected between the first direct current interface and the adapter interface and connected to the first voltage conversion circuit, where the two-way control module is configured to be capable of controlling a current direction and an output voltage of the first voltage conversion circuit according to a signal state of the first direct current interface and a signal state of the adapter interface. In the case where the first direct current interface is connected to the external power supply device and the second direct current interface is connected to the external power consumption device, the external power supply device is capable of charging the battery pack through the first direct current interface, and the external power supply device is capable of charging the external power consumption device through the second direct current interface.

An example provides an adapter. The adapter includes an adapter interface, a first direct current interface, a second direct current interface, a first voltage conversion circuit, a second voltage conversion circuit, and a two-way control module. The adapter interface is configured to be connected to a battery pack capable of being detachably connected to a power tool. The first direct current interface is capable of being electrically connected to a first external power supply device, where an input power of the first direct current interface is greater than 10 W; and a value range of an input voltage of the first direct current interface is 5 V to 20 V. The second direct current interface is capable of being electrically connected to a second external power supply device, where an input power of the second direct current interface is greater than 10 W; and a value range of an input voltage of the second direct current interface is 5 V to 20 V. The first voltage conversion circuit is connected in series between the first direct current interface and the adapter interface and configured to convert a direct current of a first direct current output interface into an electric power output adapted to the battery pack. The second voltage conversion circuit is connected in series between the second direct current interface and the adapter interface and configured to convert a direct current of a second direct current output interface into the electric power output adapted to the battery pack. The two-way control module is connected between the first direct current interface or the second direct current interface and the adapter interface and connected to the first voltage conversion circuit and the second voltage conversion circuit, where the two-way control module is configured to control a current direction and an output voltage of the first voltage conversion circuit according to a signal state of the first direct current interface and a signal state of the adapter interface; and the two-way control module is further configured to control a current direction and an output voltage of the second voltage conversion circuit according to a signal state of the second direct current interface and the signal state of the adapter interface. In the case where the first direct current interface is connected to the first external power supply device and the second direct current interface is connected to the second external power supply device, the battery pack is charged through the first direct current interface and the second direct current interface.

An example provides a combination of a battery pack and an adapter. The combination of a battery pack and an adapter includes the battery pack and the adapter. The battery pack includes a battery pack interface at least capable of being detachably connected to a power tool. The adapter is capable of being electrically connected to the battery pack. The adapter includes a plug, an adapter interface, an alternating current-direct current conversion circuit, a direct current interface, an alternating current output interface, a first voltage conversion circuit, a second voltage conversion circuit, and a two-way control module. The plug is used for access to an alternating current. The adapter interface is configured to be detachably connected to the battery pack interface. The alternating current-direct current conversion circuit is configured to convert the alternating current into a direct current capable of charging the battery pack. The direct current interface is configured to be detachably electrically connected to an external power consumption device, where an output power of the direct current interface is greater than 10 W. The alternating current output interface is configured to output the alternating current. The first voltage conversion circuit is connected in series between the adapter interface and the alternating current output interface and configured to convert a direct current output by the battery pack into an alternating current output.

The second voltage conversion circuit is connected in series between the direct current interface and the adapter interface and configured to convert electric power of the battery pack into an electric power output adapted to the external power consumption device. The two-way control module is connected between the direct current interface and the adapter interface and connected to the second voltage conversion circuit, where the two-way control module is configured to be capable of controlling a current direction and an output voltage of the second voltage conversion circuit according to a signal state of the direct current interface and a signal state of the adapter interface.

An example provides a combination of a battery pack and an adapter. The combination of a battery pack and an adapter includes the battery pack and the adapter. The battery pack includes a battery pack interface at least capable of being detachably connected to a power tool. The adapter includes an adapter interface, an alternating current output interface, a first voltage conversion circuit, a direct current interface, a second voltage conversion circuit, and a two-way control module. The adapter interface is configured to be connected to the battery pack capable of being detachably connected to the power tool. The alternating current output interface is configured to output an alternating current. The first voltage conversion circuit is connected in series between the adapter interface and the alternating current output interface and configured to convert a direct current output by the battery pack into an alternating current output.

The direct current interface is configured to be selectively connected to an external power consumption device or an external power supply device, where an output or input power of the direct current interface is greater than 10 W; and a value range of an input or output voltage of the direct current interface is 5 V to 20 V. The second voltage conversion circuit is connected in series between the direct current interface and the adapter interface, where the second voltage conversion circuit is configured to convert electric power of the external power supply device into an electric power output adapted to the battery pack; or the second voltage conversion circuit is configured to convert electric power of the battery pack into an electric power output adapted to the external power consumption device. The two-way control module is connected between the direct current interface and the adapter interface and connected to the second voltage conversion circuit, where the two-way control module is configured to be capable of controlling a current direction and an output voltage of the second voltage conversion circuit according to a signal state of the direct current interface and a signal state of the adapter interface.

The adapter and the combination of a battery pack and an adapter have simple structures and relatively low costs, are convenient to carry, expand usage scenarios of the power tool, the battery pack, the adapter, and the power supply device, and are convenient for a user to use.

DETAILED DESCRIPTION

Figure 2:
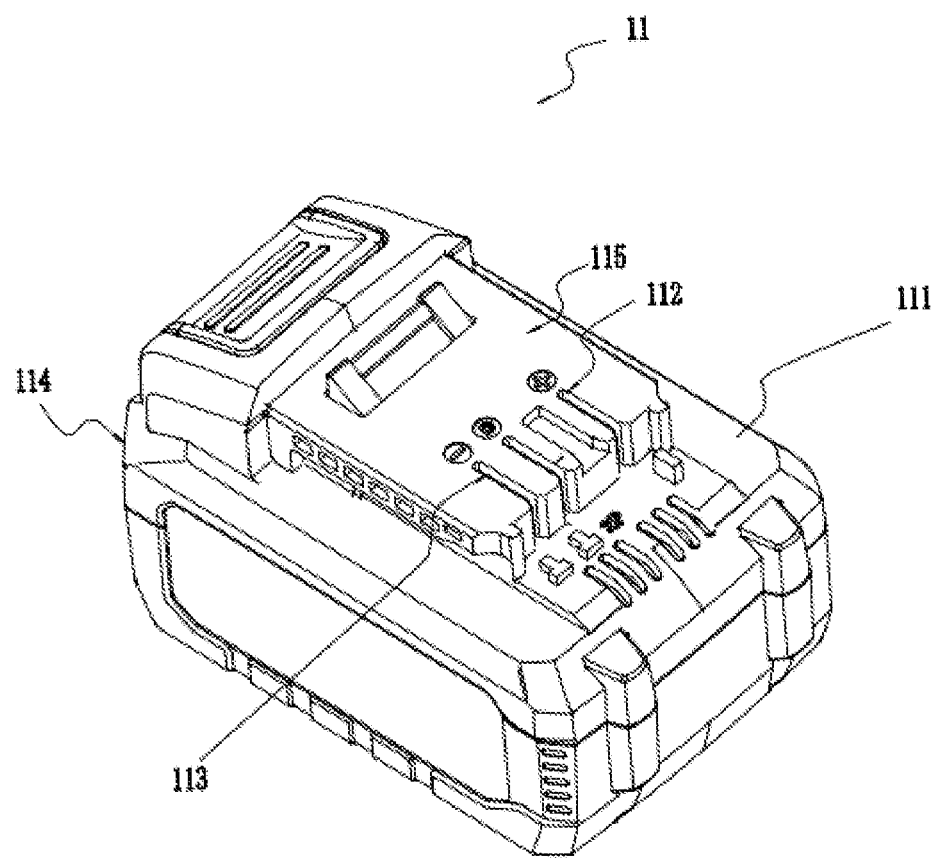
FIG. 2 is a structural view of the battery pack in the combination of a battery pack and an adapter in FIG. 1.
Figure 3:
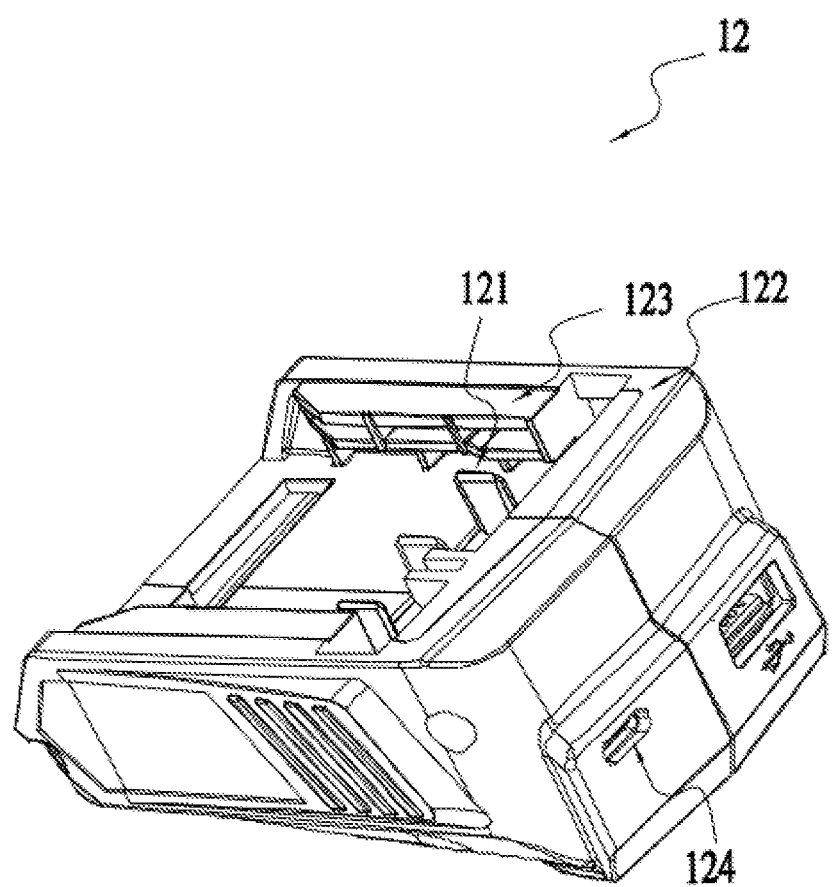
FIG. 3 is a structural view of the adapter in the combination of a battery pack and an adapter in FIG. 1.
Figure 4:
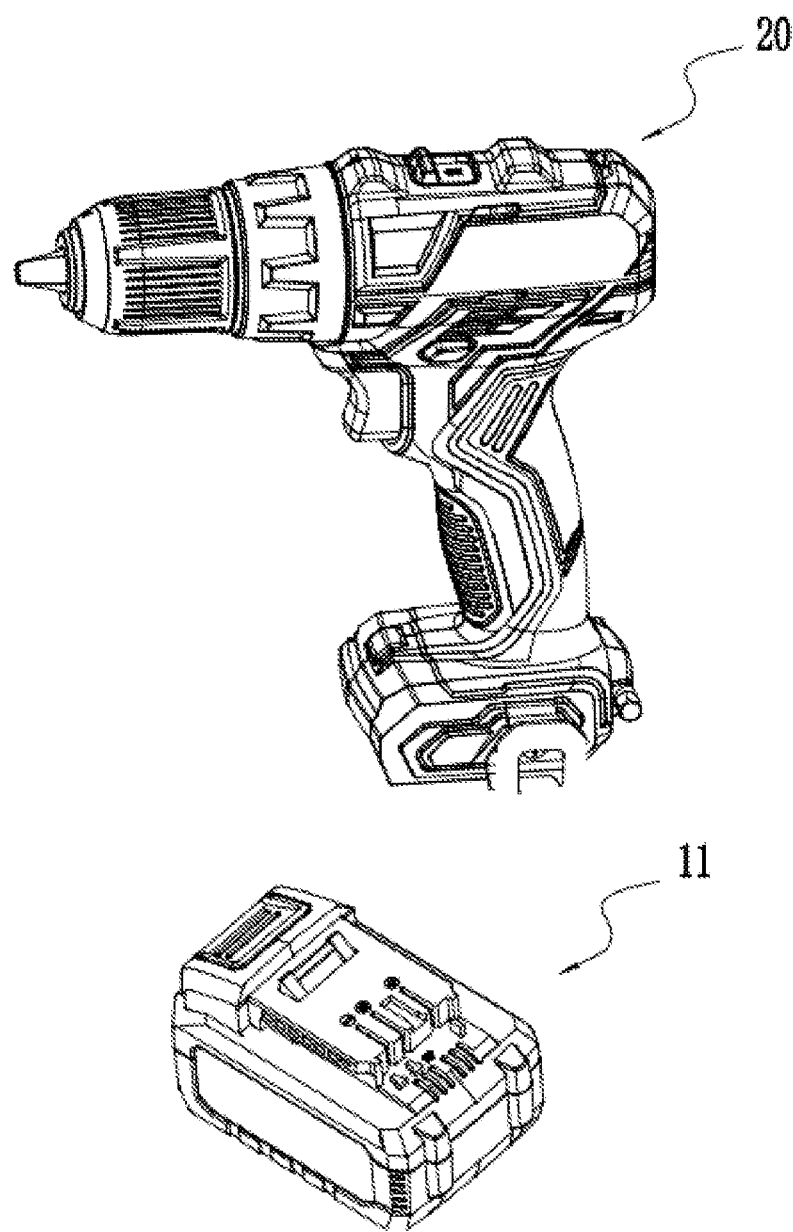
FIG. 4 is a schematic view of the battery pack in FIG. 2 and a power tool when used in combination.

As shown in FIGS. 1 to 4, a combination 10 of a battery pack and an adapter includes a battery pack 11, a second adapter 12, and a first adapter 13. The battery pack 11 is configured to supply power to a power tool 20 (as shown in FIG. 4), the second adapter 12 can enable the battery pack 11 to output electric power, and the first adapter 13 can supply power to charge the battery pack 11. In some examples, a nominal voltage range of the battery pack 11 is 10 V to 60 V, and a battery capacity of the battery pack 11 is greater than or equal to 100 Wh and less than or equal to 2000 Wh. In some examples, the nominal voltage range of the battery pack 11 may also be 18 V to 24V, 24 V to 40 V, 40 V to 60 V, or 60 V to 120 V.

Although this example relates to a hand-held power tool, it is to be understood that the present application is not limited to the disclosed example and can be applied to other types of power tools, including but not limited to garden power tools and home products, such as a vehicle-type lawn mower and a hair dryer.

As shown in FIG. 2, the battery pack 11 includes a battery 111 for storing electric power and a first casing 114 for accommodating the battery, and a battery pack terminal. The battery pack terminal includes a positive terminal 112 of the battery pack and a negative terminal 113 of the battery pack. The battery pack 11 outputs electric power through the positive terminal 112 of the battery pack and the negative terminal 113 of the battery pack. A first coupling portion 115 is formed on the first casing. The first coupling portion 115 can be detachably connected to a coupling portion of the power tool 20 so that the battery pack 11 can supply power to the power tool. The first coupling portion 115 can also enable the battery pack 11 to be electrically connected to the second adapter 12 when the battery pack 11 is coupled to the adapter 12.

Referring to FIG. 3, the second adapter 12 includes a second casing 122 and an interface 124. The second casing 122 is formed with an adapter interface 121, where the adapter interface 121 includes an electrical connection terminal and a second coupling portion 123. The second coupling portion 123 may be coupled to the first coupling portion 115 of the battery pack. When the first coupling portion 115 of the battery pack is coupled to the second coupling portion 123, the positive terminal 112 and the negative terminal 113 of the power supply are connected to the electrical connection terminal for access to or output of electric power. In some examples, the second coupling portion 123 is formed with a slot, and the electrical connection terminal is disposed in the slot. In other examples, the first coupling portion is formed with a guide groove, and the second coupling portion is provided with a guide rail fitting with the guide groove so that the battery pack may be slidably connected to the adapter along the guide rail. The second casing is further equipped with the interface 124 capable of charging and discharging. Here, the interface 124 of the second adapter 12 may be selectively connected to an external power consumption device or an external power supply device to selectively make the external power supply device charge the battery pack or make the battery pack discharged to supply power to the external power consumption device. For a circuitry architecture, reference may be made to FIGS. 6 to 14.

Figure 5:
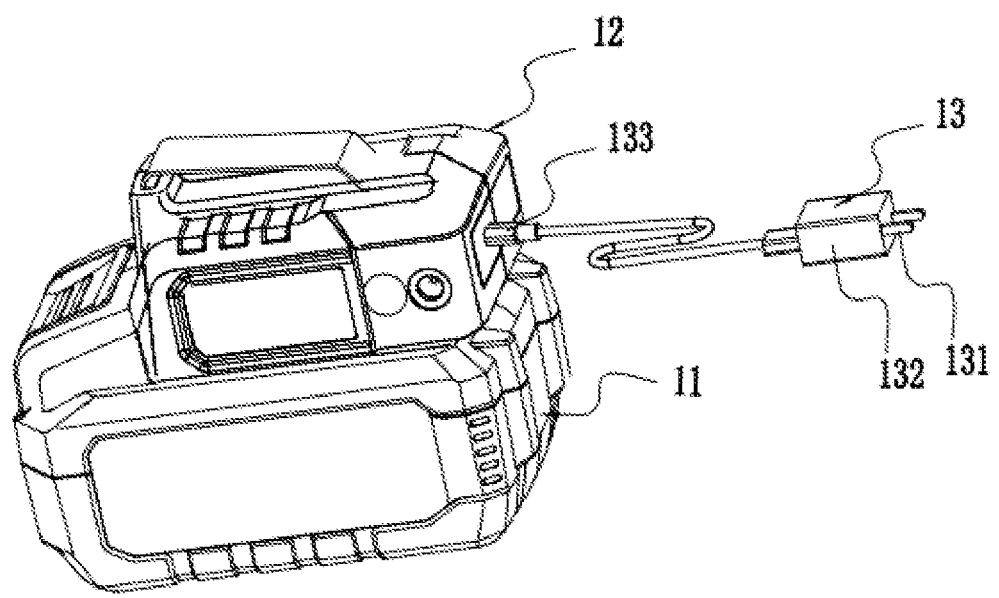
FIG. 5 is an example of the combination of a battery pack and an adapter in FIG. 1.

In some examples, referring to FIG. 5, the second adapter 12 is electrically connected to the first adapter 13. The first adapter 13 includes a power plug 131, an alternating current input interface, an alternating current-direct current conversion circuit 132, and a direct current output interface 133. In an example, the power plug 131 is used for access to the alternating current. In some examples, an alternating current plug is inserted into an alternating current socket for access to the alternating current mains. A value range of the alternating current accessed through the plug is 110 V to 130 V or 210 V to 230 V. The alternating current input interface is electrically connected to the power plug 131 to access the alternating current; the alternating current-direct current conversion circuit 132 is electrically connected to the alternating current input interface and configured to convert the alternating current into the direct current; the direct current output interface 133 is electrically connected to the alternating current-direct current conversion circuit 132 and configured to output the direct current. The interface of the second adapter is electrically connected to the direct current output interface to access the direct current, so as to supply power to the battery pack. In this example, the first adapter 13 can also directly supply power to electronic terminals such as a laptop, a mobile phone, or a mobile power supply. In the example, the first adapter 13 is an external power supply device.

Figure 6:
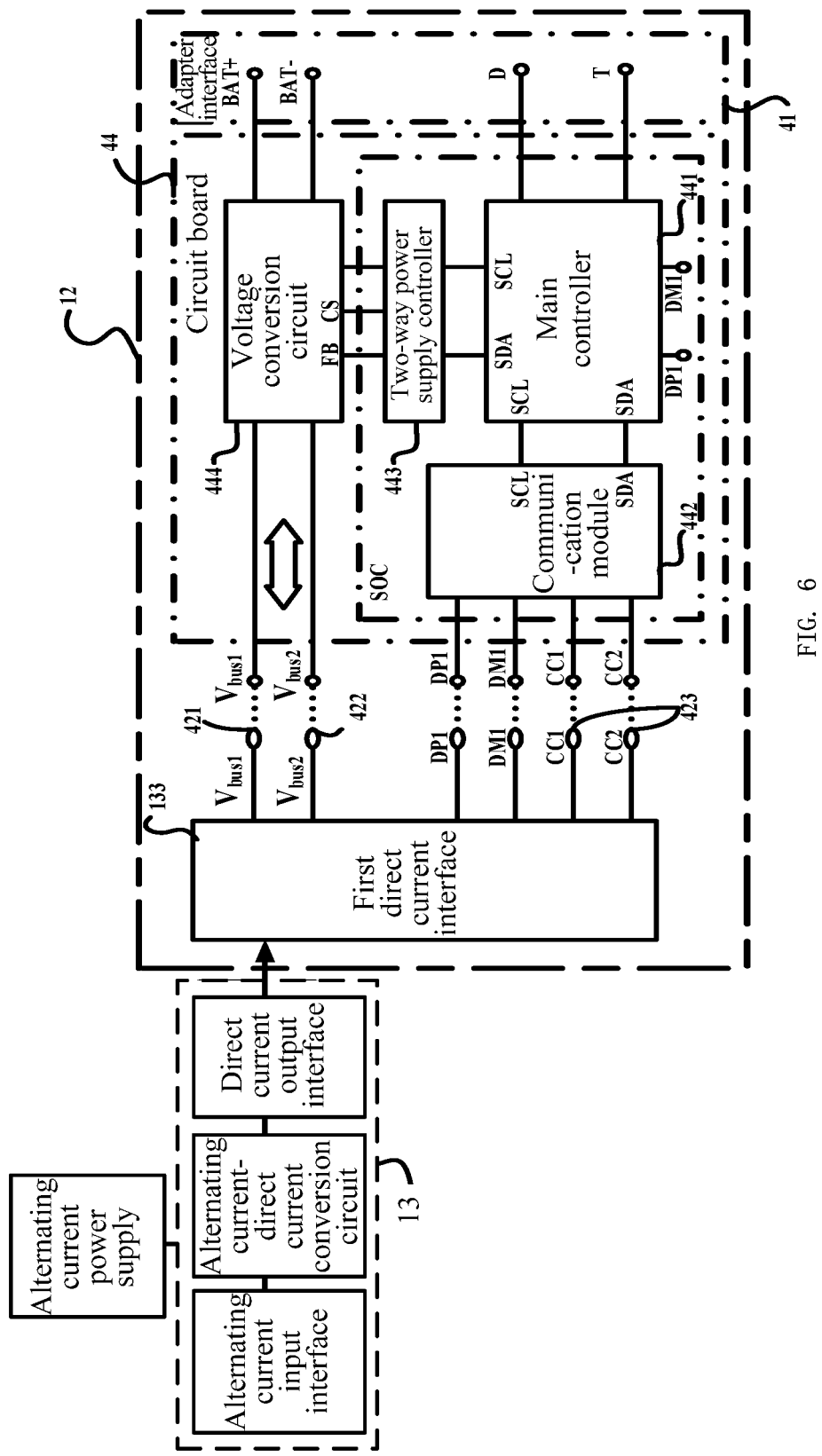
FIG. 6 is a circuit block diagram of the adapter in FIG. 5.

Referring to FIG. 6, FIG. 6 is a circuit block diagram of the adapter in FIG. 5 according to an example. The first adapter 13 includes an alternating current input interface, an alternating current-direct current conversion circuit, and a direct current output interface. The alternating current input interface is accessed to the alternating current; the alternating current-direct current conversion circuit is configured to convert the accessed alternating current into the direct current; the direct current output interface can be electrically connected to the second adaptor 12 to output the direct current.

The second adapter 12 includes a first direct current interface 133, an adapter interface 41, and a circuit board 44. The adapter interface 41 is configured to be electrically connected to the battery pack 11. The first direct current interface 133 is electrically connected to the direct current output interface.

In an example, the first direct current interface has a charge state and a discharge state. In the case where the first direct current interface is in the charge state, the first direct current interface receives electric power from the external power supply device such as the first adapter 13 so that the battery pack is charged. In the case where the first direct current interface 133 is in the discharge state, the first direct current interface 133 can also supply electric power of the battery pack to the external power consumption device (referring to FIG. 7).

The first direct current interface 133 includes at least two power terminals and a detection terminal 423. The at least two power terminals include a first power terminal 421 such as Vbus1 and a second power terminal 422 such as Vbus2, and the detection terminal 423 includes a CC1 pin and a CC2 pin. Referring to the interface 124 shown in FIG. 3, the interface 124 includes a slot and a plug tongue accommodated in the slot. A first power terminal, a second power terminal, and a detection terminal are disposed on an upper surface of the plug tongue, so as to correspond to the first power terminal 421 such as Vbus1, the second power terminal 422 such as Vbus2, and the detection terminal 423 such as the CC1 pin and/or the CC2 pin. The first power terminal 421 and the second power terminal 422 are configured to connect a positive electrode of the direct current to the positive terminal 112 of the battery pack 11. In this manner, the circuit design of at least two power terminals can bear greater power transmission, greatly improving the power transmission capacity of the first direct current interface 133, so that an output power or input power of the first direct current interface 133 is greater than 10 W, and thus the charging time or discharging time can be greatly shortened. For example, for a 2.5 Ah/24 V battery pack, it only takes 6 minutes for charging or discharging using this circuit architecture while in the related art, it often takes 6 to 7 hours using a charge circuit architecture or a discharge circuit architecture matched with the power tool.

The first power terminal 421 and the second power terminal 422 are configured to input or output electric power, the detection terminal 423 is configured to detect a signal state of the direct current interface, and the first direct current interface 133 has a charge state, a discharge state, and an empty state. In the case where the first direct current interface 133 is connected to the first adapter 13, the detection terminal 423 detects that the first direct current interface 133 is in the charge state and sends a charge control signal to the circuit board so that the first adapter 13 charges the battery pack. In the case where the first direct current interface 133 is connected to an external power consumption device 401, the detection terminal 423 detects that the first direct current interface 133 is in the discharge state and sends a discharge control signal to the circuit board 44 so that the battery pack is discharged to supply power to the external power consumption device 401.

The circuit board 44 is connected in series between the adapter interface 41 and the first direct current interface 133. In an example, the circuit board unit 44 is provided with a main controller 441, a communication module 442, a two-way power supply controller 443, and a voltage conversion circuit 444. The circuit board unit 44 may be one circuit board or may be integrated by multiple circuit boards, which is not limited herein.

In the case where the first direct current interface 133 is connected to the first adapter 13, the detection terminal 423 detects that the first direct current interface 133 is in the charge state and sends the charge control signal to the voltage conversion circuit 444. In an example, the detection terminal 423 detects that the first direct current interface 133 is in the charge state and sends the charge control signal to the communication module 442.

The communication module 442 receives the charge control signal from the detection terminal 423 and transmits the charge control signal to the main controller 441. The main controller 441 receives a communication signal of related information of the battery pack from the battery pack and transmits the communication signal to the communication module 442. The communication module 442 receives the communication signal of the related information of the battery pack from the main controller and adjusts a voltage, current, and power of an external power supply device 402.

The main controller 441 also receives the charge control signal from the communication module 442 and outputs a control signal to the two-way power supply controller 443. The two-way power supply controller 443 receives the control signal from the main controller 441 and outputs a power supply control signal to the voltage conversion circuit to control a current direction of the voltage conversion circuit 444 and control the voltage conversion circuit 444 to adjust electric power of the external power supply device 401 to form an electric power output adapted to the battery pack so that the external power supply device 401 charges the battery pack. In an example, the two-way power supply controller 443 receives the control signal from the main controller 441 and outputs a reference voltage to the voltage conversion circuit 444 to control the current direction of the voltage conversion circuit 444. For example, in the case where the first adapter 13 is connected to the first direct current interface 42, a CS pin of the two-way power supply controller outputs a positive voltage to the voltage conversion circuit so that the external power supply device 402 charges the battery pack. In the case where the external power consumption device 401 is connected to the first direct current interface, the CS pin of the two-way power supply controller outputs a negative voltage to the voltage conversion circuit so that the battery pack is discharged to supply power to the external power consumption device 401. The voltage conversion circuit 444 matches a voltage of the first direct current interface 42 with a voltage of the battery pack 11.

In some examples, the detection terminal 423 of the first direct current interface 133 includes the CC1 pin and/or the CC2 pin, and the CC1 pin and/or the CC2 pin are control pins to generate a communication signal. The first power terminal 421 is a Vbus1 pin, and the second power terminal 422 is a Vbus2 pin. The CC1 pin and/or the CC2 pin are used for determining whether a device connected to the first direct current interface 133 is an external power supply device or an external power consumption device, and the change of a state of the CC1 pin and/or the CC2 pin is detected by the communication module.

In another example of the present application, referring to the interface 124 shown in FIG. 3, for example, the CC1 pin is disposed on the upper surface of the plug tongue and the CC2 pin is disposed on a lower surface of the plug tongue opposite to the upper surface. When a corresponding interface of the external power supply device or the external power consumption device is inserted into the interface 124 shown in FIG. 3, the CC1 pin and the CC2 pin together generate a communication signal. For example, when the corresponding interface of the external power supply device is inserted in the interface 124 shown in FIG. 3 in a forward direction and the corresponding interface of the external power consumption device is inserted into the interface 124 shown in FIG. 3 in a backward direction, the CC1 pin on the upper surface of the plug tongue and the CC2 pin on the lower surface of the plug tongue together generate a communication signal.

When the CC1 pin and the CC2 pin are in an idle state, no device is connected in this case. In the case where the first adapter 13 is connected to the first direct current interface 133, the CC1 pin and/or the CC2 pin detect a high level, the first adapter 13 is equivalent to a pull-up resistor, it is determined that the first direct current interface 133 is a power supply side, the battery pack 11 is equivalent to a pull-down resistor and determined as a power receiving side, the main controller 441 acquires current charge information of the battery pack and transmits the current charge information to a communication module 442 through an SDA pin and an SCL pin on the main controller 441, the communication module 442 adjusts a voltage, current, and power of the external power supply device, a voltage adapted to the battery pack is obtained through the voltage conversion circuit 444, and the external power supply device charges the battery pack with the voltage adapted to the battery pack. A standard voltage range of the first direct current interface 133 is 5 V to 20 V, which can achieve a continuously adjustable voltage from 5 V to 20 V and support any relatively large source output power of 10 W to 100 W.

Figure 7:
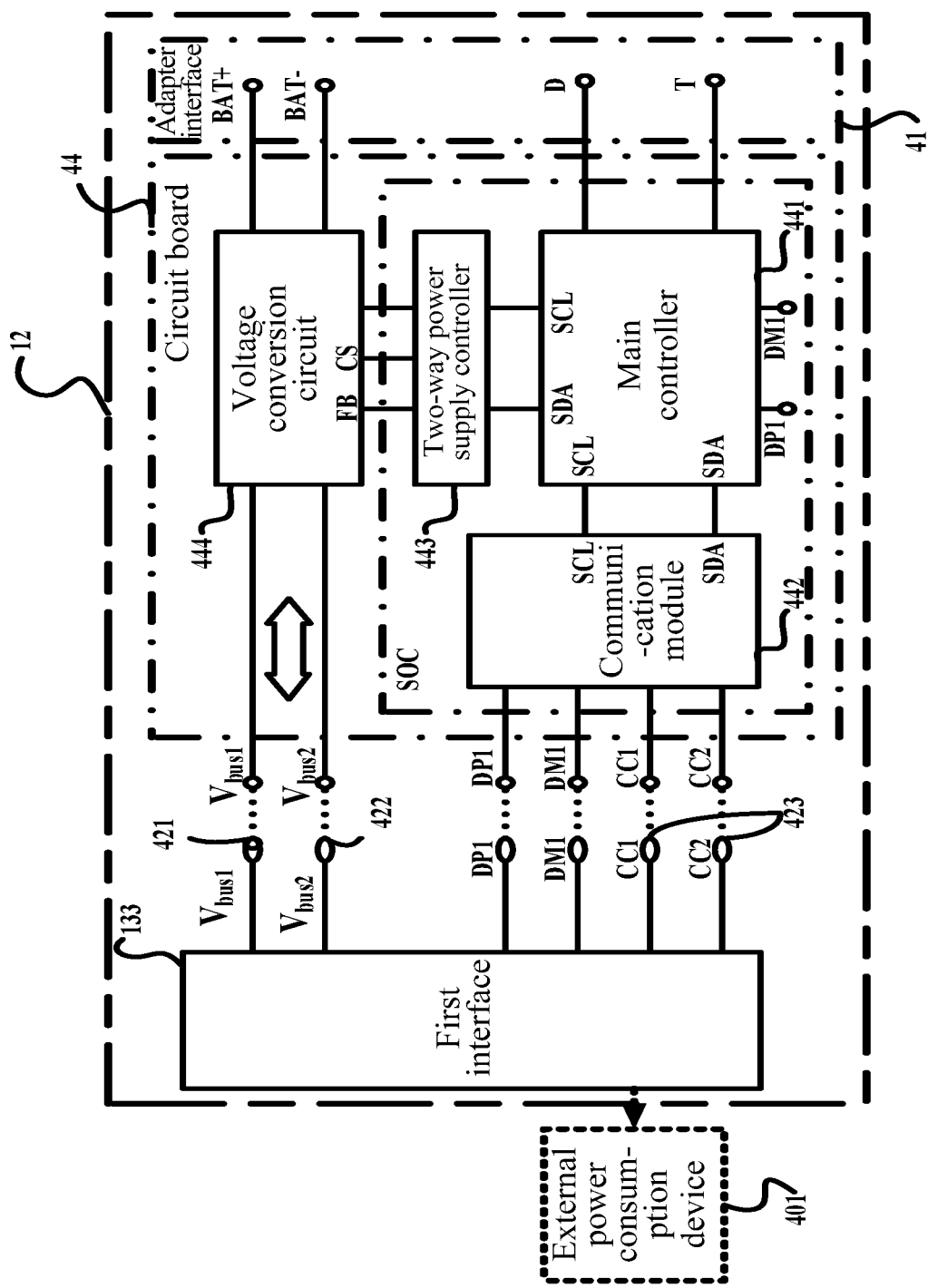
FIG. 7 is a circuit block diagram of the adapter in FIG. 3.

Referring to FIG. 7, in the case where the first direct current interface 133 is connected to the external power consumption device 401, the CC1 pin and/or the CC2 pin detect a low level, the external power consumption device 401 is equivalent to a pull-down resistor, it is determined that the first direct current interface 133 is a power receiving side, the battery pack is equivalent to a pull-up resistor and determined as a power supply side, the communication module 442 detects the change in the state of the CC1 pin and/or the CC2 pin and transmits a signal to the main controller 441 through the SCL pin and the SDA pin, the main controller 441 outputs a control signal to the two-way power supply controller 443, the two-way power supply controller receives the control signal and controls the current direction of the voltage conversion circuit 444, and the voltage conversion circuit 444 matches a discharge voltage of the battery pack with a charge voltage required by the external power consumption device 401 so that the external power consumption device 401 is charged.

In this manner, a combination of a battery pack and an adapter shown in FIG. 5 is provided so that an external power supply device of a smartphone or a laptop available on site may be used for charging the battery pack with a high power through the first direct current interface, or the adapter may be used for outputting the electric power stored in the battery pack so that the battery pack is discharged to supply power to an external power consumption device such as the smartphone or the laptop. Therefore, the combination of a battery pack and an adapter is greatly convenient for a user to use. Since a design circuit architecture of the two-way power supply controller is adopted in the adapter, the charge and discharge control can be achieved through the same controller, which reduces the introduction of other operational amplifier circuits and simplifies the circuit structure. Moreover, the adapter can achieve high power greater than 10 W.

In some examples, the main controller 441, the first communication module 442, and the two-way power supply controller 443 may be integrated into a system on a chip (SOC).

Figure 8:
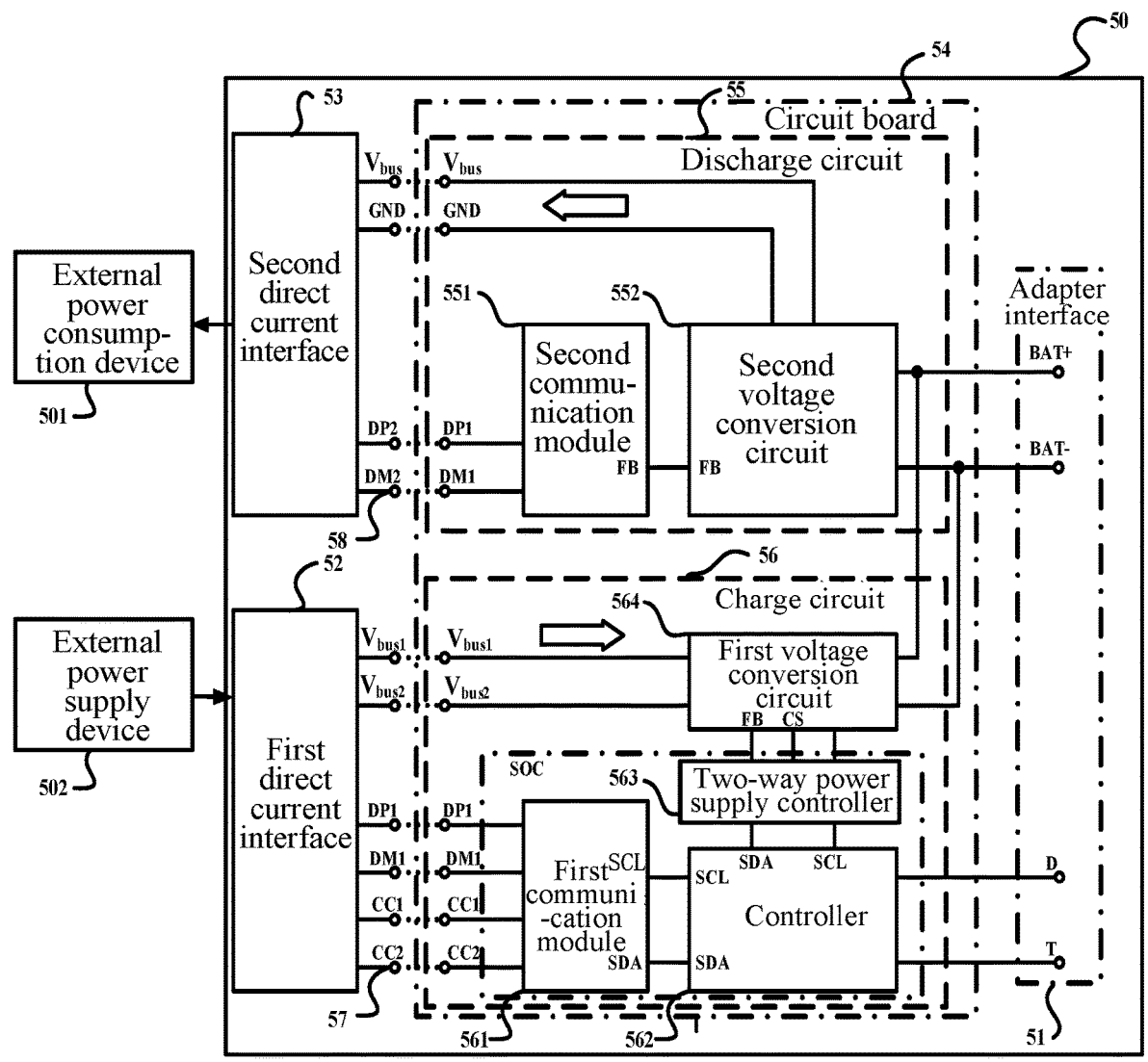
FIG. 8 is a circuit block diagram of the adapter in FIG. 3.

Reference may be made to an adapter 50 shown in FIG. 8 as one of the examples. The difference from the example shown in FIGS. 6 and 7 is that the adapter 50 includes a first direct current interface 52 and a second direct current interface 53. The adapter 50 further includes a discharge circuit 55 and a charge circuit 56.

The first direct current interface 52 is an interface that can achieve charge and discharge with a high power greater than 10 W and is the same type of interface as the first direct current interface 133 of the adapter 12 in the example shown in FIG. 6.

The second direct current interface 53 is configured to be connected to an external power consumption device 501 and supply electric power to the external power consumption device 501. The second direct current interface 53 is an interface that supplies power to an external device and has an operation power of 5 V/2 A.

The discharge circuit 55 is configured to convert electric power output by an adapter interface 51 into a voltage output adapted to the second direct current interface 53; the discharge circuit 55 is disposed on a circuit board 54 and connected in series between the adapter interface 51 and the second direct current interface 53. The discharge circuit 55 includes a second communication module 551 and a second voltage conversion circuit 552.

The charge circuit 56 is configured to convert electric power of the external power supply device 502 connected to the first direct current interface 52 to charge the battery pack through the external power supply device 502, and the charge circuit 56 is connected in series between the adapter interface 51 and the first direct current interface 52.

In some examples, a second communication terminal 58 such as a DM2 pin is disposed in the second direct current interface 53. The second communication terminal 58 is configured to detect an interface state of the second direct current interface 53. The interface state of the second direct current interface 53 includes an empty state and a discharge state. In the case where the external power consumption device is connected to the second direct current interface, the second communication terminal 58 detects the discharge state and sends a communication signal to the second communication module 551.

The second communication module 551 receives a communication signal of state information of the second direct current interface 53 and transmits the communication signal to the second voltage conversion circuit 552.

The second voltage conversion circuit 552 receives a state signal of the second direct current interface from the second communication module 551 and then converts the voltage of the battery pack into a voltage adapted to the external power consumption device 501.

The charge circuit 56 includes a first communication module 561, a main controller 562, a two-way power supply controller 563, and a first voltage conversion circuit 564.

The first voltage conversion circuit 564 is connected in series between the first direct current interface 52 and the adapter interface 51 and configured to convert the electric power of the external power supply device 502 into the electric power output adapted to the battery pack. The first voltage conversion circuit 564 converts a voltage of the first direct current interface 52 such that the voltage of the first direct current interface 52 is adapted to the voltage of the battery pack.

In the case where the first direct current interface 52 is connected to the external power supply device 502, the detection terminal 57 detects a high level, determines that the first direct current interface is in the charge state, and sends the charge control signal to the first communication module 561. The first communication module 561 receives the charge control signal from the detection terminal 57 and transmits the charge control signal to the main controller 562. The main controller 562 is configured to be capable of receiving a communication signal about battery pack information from the battery pack and transmitting the communication signal of the battery pack information to the first communication module 561. The first communication module 561 receives the communication signal of the related information of the battery pack from the main controller 562 and adjusts a voltage, current, and power of the external power supply device 502.

The main controller 562 is further configured to receive the charge control signal from the first communication module 561 and output a control signal to the two-way power supply controller 563. The two-way power supply controller 563 can output a power supply control signal to the first voltage conversion circuit 564 according to the control signal from the main controller 562 to control a current direction of the first voltage conversion circuit 564 and control the first voltage conversion circuit 564 to adjust the electric power of the external power supply device 502 to adapt to an electric power output of the battery pack so that the external power supply device 502 charges the battery pack. In some examples, the two-way power supply controller 563 receives the control signal from the main controller 562 and outputs a reference voltage to the first voltage conversion circuit 564 to control the current direction of the first voltage conversion circuit 564. For example, in the case where the external power supply device 502 is connected to the first direct current interface 52, the CS pin of the two-way power supply controller 563 outputs a positive voltage to the voltage conversion circuit so that the external power supply device 502 charges the battery pack.

In some examples, the first direct current interface 52 includes at least two power terminals, where the at least two power terminals are connected to a positive electrode of the external power supply device 502 and configured to output electric power. First detection terminals 57 such as the CC1 pin and the CC2 pin are disposed in the first direct current interface 52 and configured to detect a signal state of the first direct current interface 52, and the second communication terminal 58 such as the DM2 pin is disposed in the second direct current interface 53, where the interface state of the second direct current interface is obtained through the second communication terminal 58 such as the DM2 pin. Since the second communication terminal such as the DM2 pin is different from the first detection terminals such as the CC1 pin and the CC2 pin of the first direct current interface 52, the second communication terminal such as the DM2 pin cannot selectively have the charge state and the discharge state and is in the discharge state by default, or the second direct current interface 53 has no additional detection terminals or conductive terminals used for selecting the charge state and the discharge state. In the case where the external power consumption device 501 is inserted into the second direct current interface 53 and the external power supply device 502 is inserted into the first direct current interface 52, a second detection terminal 58 detects that the power consumption device is connected, the first detection terminal 57 detects a high level, it is determined that the first direct current interface 52 is in the charge state, and the first direct current interface 52 is determined as the power supply side. The main controller 562 acquires the current charge information of the battery pack and transmits the current charge information to the first communication module 561 through the SDA pin and the SCL pin on the main controller 562. The first communication module 561 adjusts the voltage, current, and power of the external power supply device 502, a voltage adapted to the battery pack and/or the external power consumption device 501 is obtained through the first voltage conversion circuit 564, and the external power supply device 502 charges the battery and/or the external power consumption device 501 with the voltage adapted to the battery and/or the external power consumption device 501. For example, the external power supply device provides a 40 W charging power to the battery pack at 20 V/3 A and provides a 20 W charging power to a first power consumption device.

In this manner, in the case where the first direct current interface is connected to the external power supply device and the second direct current interface is connected to the external power consumption device, the external power supply device charges the battery pack through the first direct current interface, and the external power supply device is discharged to supply power to the external power consumption device through the second direct current interface. Moreover, through the adapter, it is possible to charge the external power consumption device and the battery pack at the same time. The charge circuit and the discharge circuit are divided into two sets of circuits so that interference between the circuits can be reduced and each interface can work independently.

Figure 9:
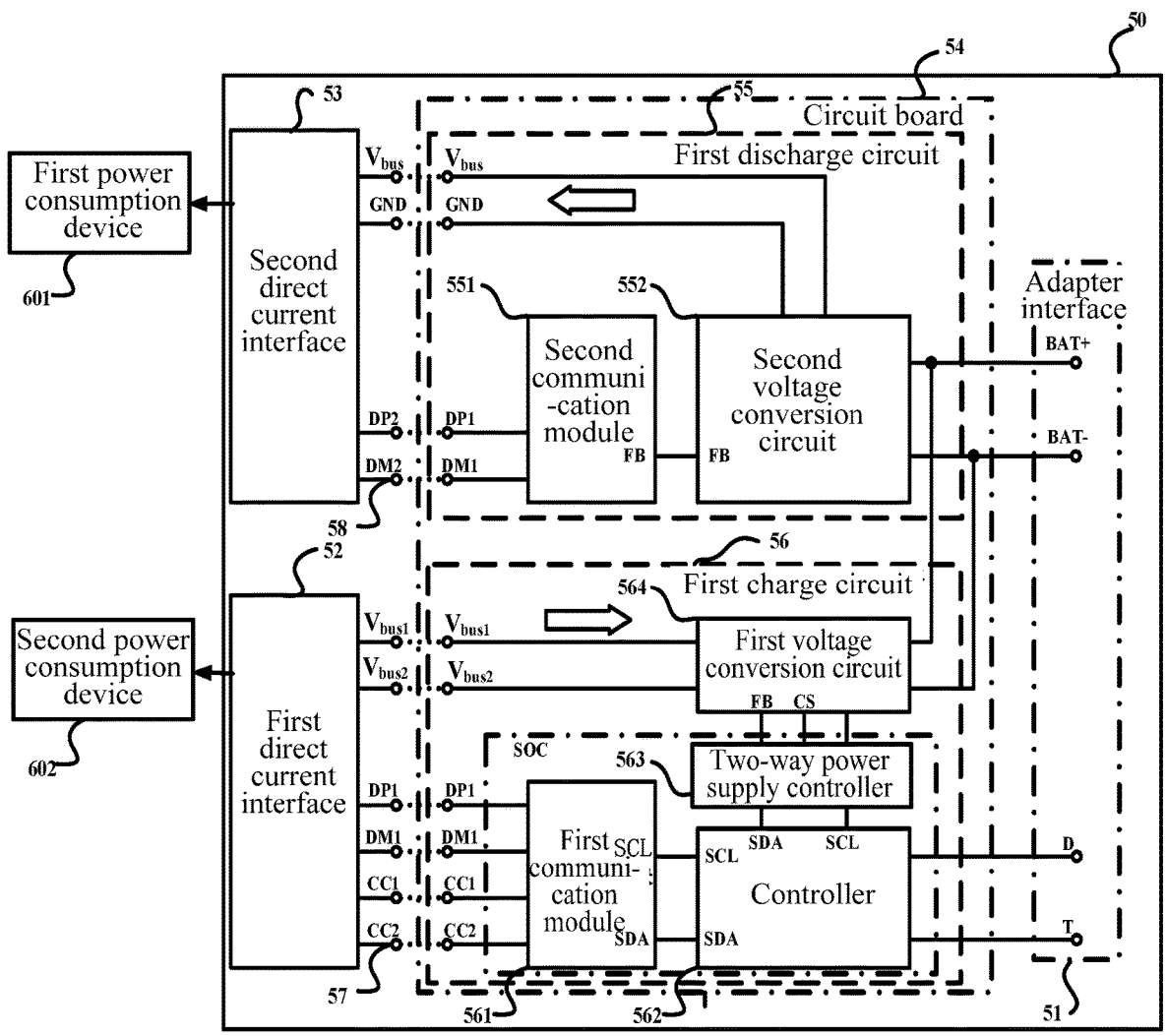
FIG. 9 is a circuit block diagram of the adapter in FIG. 3.

Referring to the adapter 50 shown in FIG. 9, in some examples, in the case where a first power consumption device 601 is inserted into the second direct current interface 53 and a second power consumption device 602 is also inserted into the first direct current interface 52, the first detection terminal 57 determines that the first direct current interface 52 is in the discharge state, the main controller 562 acquires current charge information of the first direct current interface 52 through the first communication module 561, a voltage of the battery pack is matched with a voltage of the first power consumption device 501 and a voltage of the second power consumption device 502 through the second voltage conversion circuit 552 and the first voltage conversion circuit 564, respectively, and then the battery pack outputs electric power to supply power to the first power consumption device 501 and the second power consumption device 502 at the same time.

In an example, in the case where the second power consumption device is inserted into the first direct current interface 52 and the first detection terminal 57 detects a low level and determines that the first direct current interface 52 is in the discharge state, the first detection terminal 57 sends the discharge control signal to the first communication module 661.

The first communication module 561 is configured to be capable of receiving the discharge control signal from the first detection terminal 57 and transmitting the discharge control signal to the main controller 562; the first communication module 561 is further configured to be capable of receiving a communication signal of charge information from the external power consumption device 502 and transmitting the communication signal of the charge information to the main controller 562.

The main controller 562 is configured to be capable of receiving the discharge control signal and the communication signal of the charge information and outputting a control signal to the two-way power supply controller 563.

The two-way power supply controller 563 is configured to be capable of outputting a power supply control signal to the first voltage conversion circuit 564 according to the received control signal from the main controller 562 to control the current direction of the first voltage conversion circuit 564 and control the first voltage conversion circuit 564 to adjust a voltage value so that the battery pack charges the external power consumption device 502.

As an example, the main controller 562, the first communication module 561, and the two-way power supply controller 563 may be integrated into an SOC; or the main controller 562 and the two-way power supply controller 563 may be integrated into one control module.

In this manner, in the case where the first direct current interface 52 is connected to the external power consumption device and the second direct current interface 53 is connected to the external power consumption device, the battery pack can charge different external power consumption devices at the same time through the adapter so that usage scenarios of the battery pack are expanded and thus the battery pack is convenient for a user to use. At the same time, discharge circuits of two interfaces are divided into two sets of circuits so that interference between the circuits can be reduced and each interface can work independently.

Figure 10:
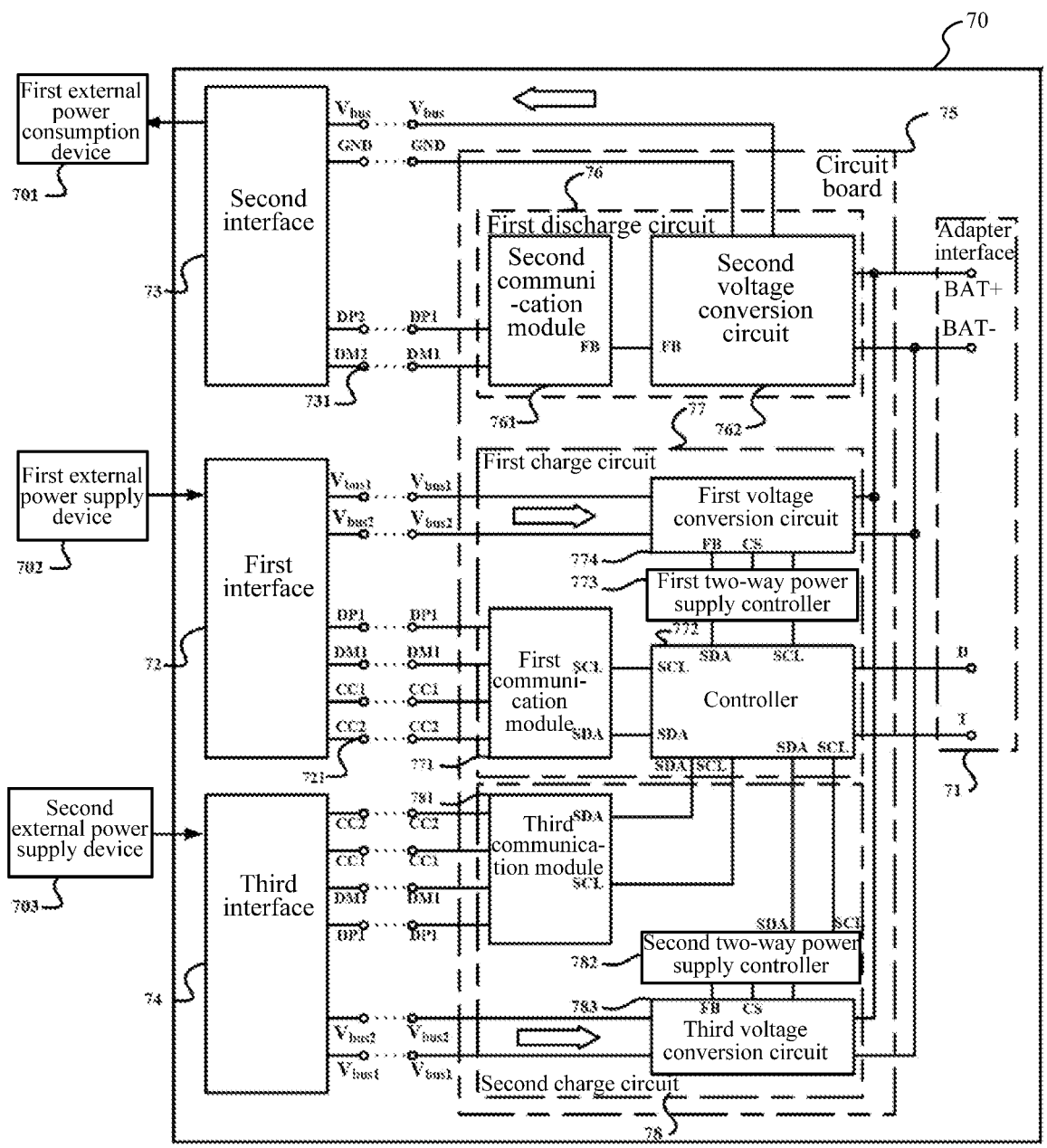
FIG. 10 is a circuit block diagram of the adapter in FIG. 3.

Referring to FIG. 10, the difference from FIG. 8 is that the adapter 70 in the example shown in FIG. 10 is equipped with a first direct current interface 72, a second direct current interface 73, and a third direct current interface 74. The third direct current interface 74 and the first direct current interface 72 are the same type of interface as the first direct current interface 133 in the example shown in FIG. 6. The first direct current interface 72 is provided with a detection terminal 721, and the third direct current interface 74 is provided with a detection terminal 741. In some examples, the first direct current interface 72 and the third direct current interface 74 both includes at least two power terminals, where the at least two power terminals are connected to the positive electrode of the external power supply device and configured to output electric power.

The adapter further includes a first discharge circuit 76, a first charge circuit 77, and a second charge circuit 78.

The first direct current interface 72 and the third direct current interface 74 are interfaces that can achieve the input and output of high-power (greater than 10 W) electric power.

The second direct current interface 73 is configured to be connected to a first external power consumption device 701 and supply electric power of the battery pack to the first external power consumption device 701. The second direct current interface 73 is an interface that supplies power to an external device and has an operation power of 5 V/2 A.

The first discharge circuit 76 is configured to convert the electric power of the battery pack or the electric power of the external power supply device into an electric power output adapted to the second direct current interface 73. In some examples, the first discharge circuit 76 is disposed on a circuit board 75 and connected in series between an adapter interface 71 and the second direct current interface 73.

The first charge circuit 77 is connected in series between the adapter interface 71 and the first direct current interface 72 and configured to convert electric power of a first external power supply device 702 connected to the first direct current interface 72 so that the first external power supply device 702 charges the battery pack and the first external power consumption device 701.

The second charge circuit 78 is configured to convert electric power of a second external power supply device 703 connected to the third direct current interface 74 so that the second external power supply device 703 charges the battery pack and the first external power consumption device 701, and the second charge circuit is connected in series between the adapter interface 71 and the third direct current interface 73.

The first discharge circuit 76 includes a second communication module 761 and a second voltage conversion circuit 762. The second communication module 761 is connected to the second voltage conversion circuit 762, the second voltage conversion circuit 762 is connected to the adapter interface 71, and the second voltage conversion circuit 762 converts a voltage accessed to the second voltage conversion circuit into a voltage adapted to the first external power consumption device 701 so that the first external power consumption device 701 is charged.

The first charge circuit 77 includes a first communication module 771, a main controller 772, a first two-way power supply controller 773, and a first voltage conversion circuit 774.

In the case where the first direct current interface 72 is connected to the first external power supply device 702, the detection terminal detects a high level, determines that the first direct current interface 72 is in the charge state, and sends the charge control signal to the first communication module 771. The first communication module 771 receives the charge control signal from the detection terminal 721 and outputs the charge control signal to the main controller 772. The main controller 772 is configured to be capable of receiving a communication signal about battery pack information from the battery pack and transmitting the communication signal of the battery pack information to the first communication module 771. The first communication module 771 receives the communication signal of related information of the battery pack from the main controller 772 and adjusts a voltage, current, and power of the first external power supply device 702.

The main controller 772 is further configured to receive the charge control signal from the first communication module 771 and output a control signal to the first two-way power supply controller 773. The first two-way power supply controller 773 is configured to be capable of outputting a power supply control signal to the first voltage conversion circuit 774 according to the control signal from the main controller 772 to control a current direction of the first voltage conversion circuit 774 and control the first voltage conversion circuit 774 to adjust electric power of the first external power supply device 702 to adapt to the electric power output of the battery pack so that the first external power supply device 702 charges the battery pack. In some examples, the first two-way power supply controller 773 receives the control signal from the main controller 772 and outputs a reference voltage to the first voltage conversion circuit 774 to control the current direction of the first voltage conversion circuit 774. For example, in the case where the first external power supply device 702 is connected to the first direct current interface 72, the CS pin of the two-way power supply controller outputs a positive voltage to the voltage conversion circuit so that the first external power supply device 702 charges the battery pack. In the case where the external power consumption device is connected to the first direct current interface 72, the CS pin of the two-way power supply controller outputs a negative voltage to the voltage conversion circuit so that the battery pack charges the external power consumption device.

The second charge circuit 78 includes a third communication module 781, a second two-way power supply controller 782, and a third voltage conversion circuit 783. The second charge circuit and the first charge circuit share the main controller 772 so that the main controller 772 controls the third voltage conversion circuit 783 to adjust electric power of the second external power supply device 703 to adapt to the electric power output of the battery pack and thus the second external power supply device 703 charges the battery pack.

In this manner, multiple external power supply devices can charge the battery pack through the first direct current interface 72 and the third direct current interface 74 at the same time so that the charging efficiency is higher and the speed is faster. It can be applied to a battery pack with a nominal voltage range of 40 V to 120 V.

In some examples, the second direct current interface 73 and/or the third direct current interface 74 may be inserted into the external power consumption device, and the battery pack can charge the connected power consumption device.

Figure 11:
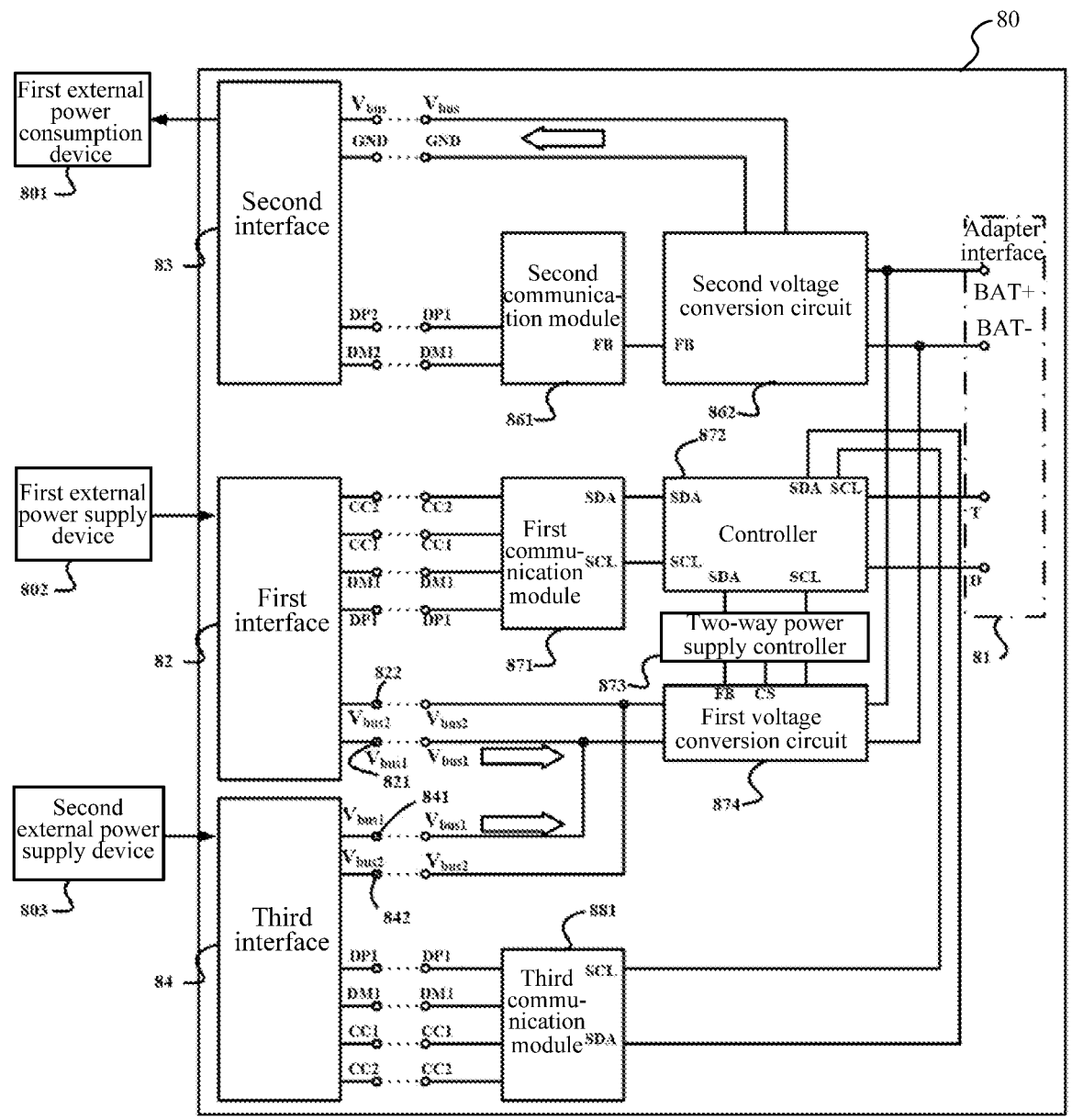
FIG. 11 is a circuit block diagram of the adapter in FIG. 3.

FIG. 11 shows an adapter 80 as one of the examples. The difference from FIG. 10 is that a third direct current interface 84 and a first direct current interface 82 of the adapter 80 in the example shown in FIG. 10 share a two-way power supply controller 873 and a first voltage conversion circuit 874. Moreover, a positive terminal 821 of the first direct current interface 82 and a positive terminal 841 of the third direct current interface are connected in series to the first voltage conversion circuit 874, and a negative terminal 822 of the first direct current interface 82 and a negative terminal 842 of the third direct current interface are connected in series to a second voltage conversion circuit 874. A first communication module 871 is connected to a main controller 872, and the main controller 872 acquires a current signal state of the first direct current interface 82 through the first communication module 871. A third communication module 881 is also connected to the main controller 872. The third communication module 881 acquires a signal state of the third direct current interface 84 and transmits a signal to the main controller 872. The main controller 872 acquires current charge information of the battery pack and transmits a control signal to the two-way power supply controller 873. The first voltage conversion circuit 874 is controlled to convert a voltage of the first direct current interface and a voltage of the third direct current interface such that the voltage of the first direct current interface and the voltage of the third direct current interface are adapted to a voltage of the battery pack and/or a voltage of a first external power consumption device. In this manner, a first external power supply device 801 and a second external power supply device 802 supply power to the battery pack and/or the first external power consumption device 801.

In some examples, the first direct current interface 82 and the third direct current interface 84 may also be connected to the external power consumption device, and the battery pack supplies power to the first direct current interface 82, a second direct current interface 83, and the third direct current interface 84. In an example, the first direct current interface 82 and the third direct current interface 84 can only operate in a charge or discharge mode at the same time.

Figure 12:
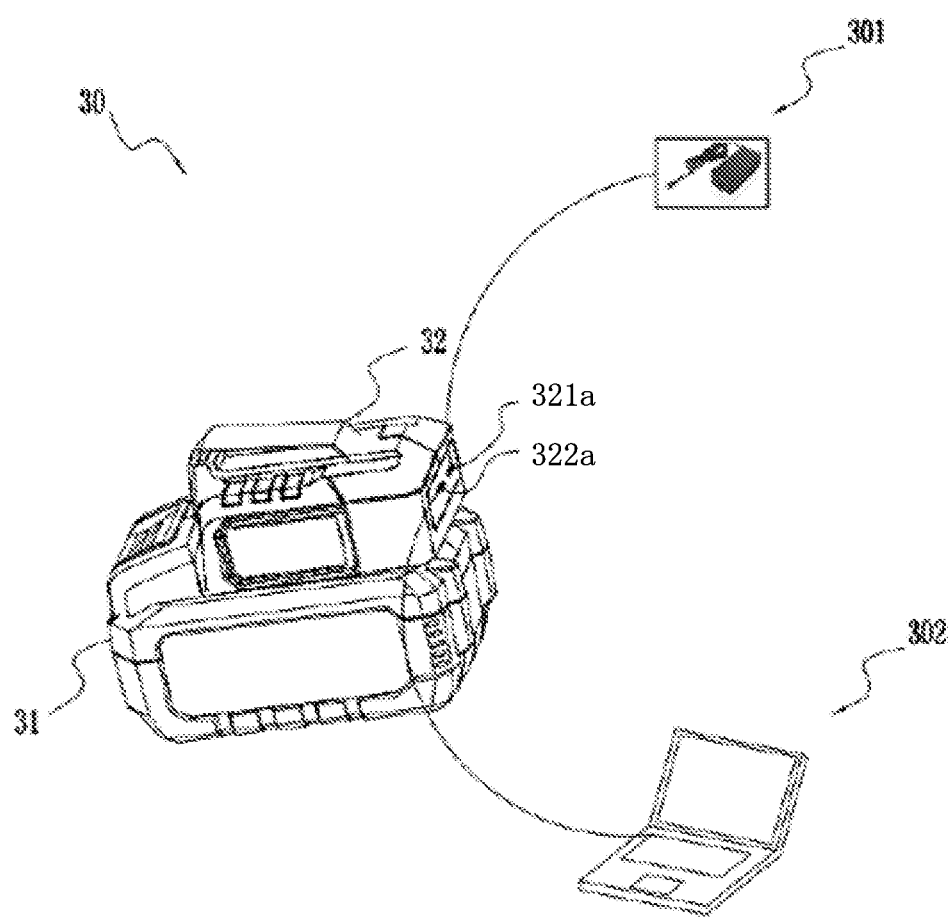
FIG. 12 is a structural view of the combination of a battery pack and an adapter in FIG. 1 according to another example.

In some examples, referring to a combination of a battery pack and an adapter shown in FIG. 12, the combination of a battery pack and an adapter includes a battery pack 31, a first adapter 301, a second adapter 32, and an external power consumption device 302.

The difference from the combination of a battery pack and an adapter shown in FIG. 5 is that the second adapter 32 further includes a second direct current interface 322a, where an input and output power of a first direct current interface 321a and the second direct current interface 322a is greater than 10 W. The first direct current interface 321a may be electrically connected to an external power supply device 301 to access electric power, where the external power supply device 301 may be a power adapter of a laptop. The second direct current interface 322a is connected to the external power consumption device 302 to provide a direct current from the external power supply device 301 or the electric power of the battery pack to the external power consumption device. The external power consumption device 302 may be a power consumption device such as a mobile phone, a tablet computer, and a wearable device, which is not limited herein.

Figure 13:
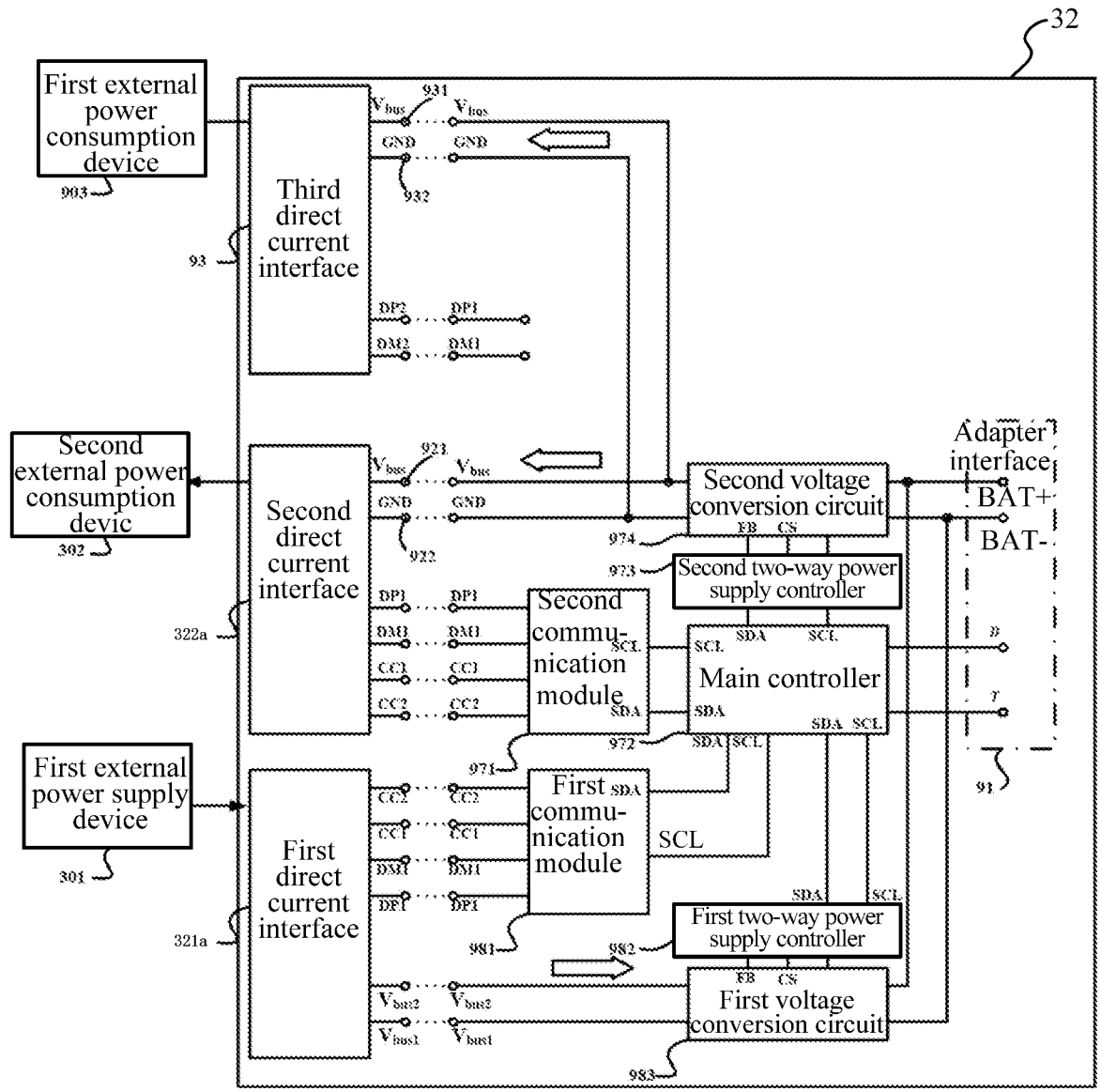
FIG. 13 is a circuit block diagram of the adapter in FIG. 12.

Referring to FIG. 13, FIG. 13 is a circuit block diagram of the adapter in FIG. 12 according to an example. The second adapter further includes a third direct current interface 93, where an output power of the third direct current interface 93 is 5 V/2 A. The difference from the example shown in FIG. 10 is that a positive terminal 931 of the third direct current interface 93 and a positive terminal 921 of the second direct current interface 322a are connected in series to a first voltage conversion circuit 974, and a negative terminal 932 of the third direct current interface 93 and a negative terminal 922 of the second direct current interface 322a are connected in series to the first voltage conversion circuit 974. Both the first direct current interface 321a and the second direct current interface 322a include detection terminals, that is, the CC1 pin and the CC2 pin; and the third direct current interface 93 has communication terminals, that is, a DM1 pin or the DM2 pin. In an example, in the case where the second direct current interface 322a operates in the discharge state, an operation power of the second direct current interface 322a and an operation power of the third direct current interface 93 are the same, which are 5 V/2 A. In the case where the second direct current interface 322a operates in the charge state, the third direct current interface 93 cannot operate. Since the first direct current interface 321a has an independent control circuit, the first direct current interface 321a can operate independently. The first direct current interface 321a can be connected to the external power supply device for charging or connected to the external power consumption device for discharging.

In some examples, each of the first direct current interface 321a and the second direct current interface 322a includes at least two power positive terminals, where the at least two power positive terminals of the first direct current interface 321a are connected to a positive electrode of the external power supply device 301; and the at least two power positive terminals of the second direct current interface 322a are connected to a positive electrode of the external power consumption device 302.

In this manner, a combination of a battery pack and an adapter as shown in FIG. 12 is provided, and discharge is performed through the second direct current interface, so as to supply power to the external power consumption device. For example, the adapter may be configured to output the electric power stored in the battery pack to perform discharge to supply power to the external power consumption device such as a smartphone or a laptop so that the application scenarios are no longer limited to the discharge of the battery pack or the battery pack supplying power to the power tool, that is, the actual application scenarios of the battery pack are greatly expanded. At the same time, an external power supply device of a smartphone or a laptop available on site may also be used for charging the battery pack with a high power through the first direct current interface, which is greatly convenient for a user. Since a design circuit architecture of the two-way power supply controller is adopted in the adapter, the charge and discharge control can be achieved through the same controller, which reduces the introduction of other operational amplifier circuits and simplifies the circuit structure. Moreover, the adapter can achieve charge and discharge with a high power greater than 10 W.

Figure 14:
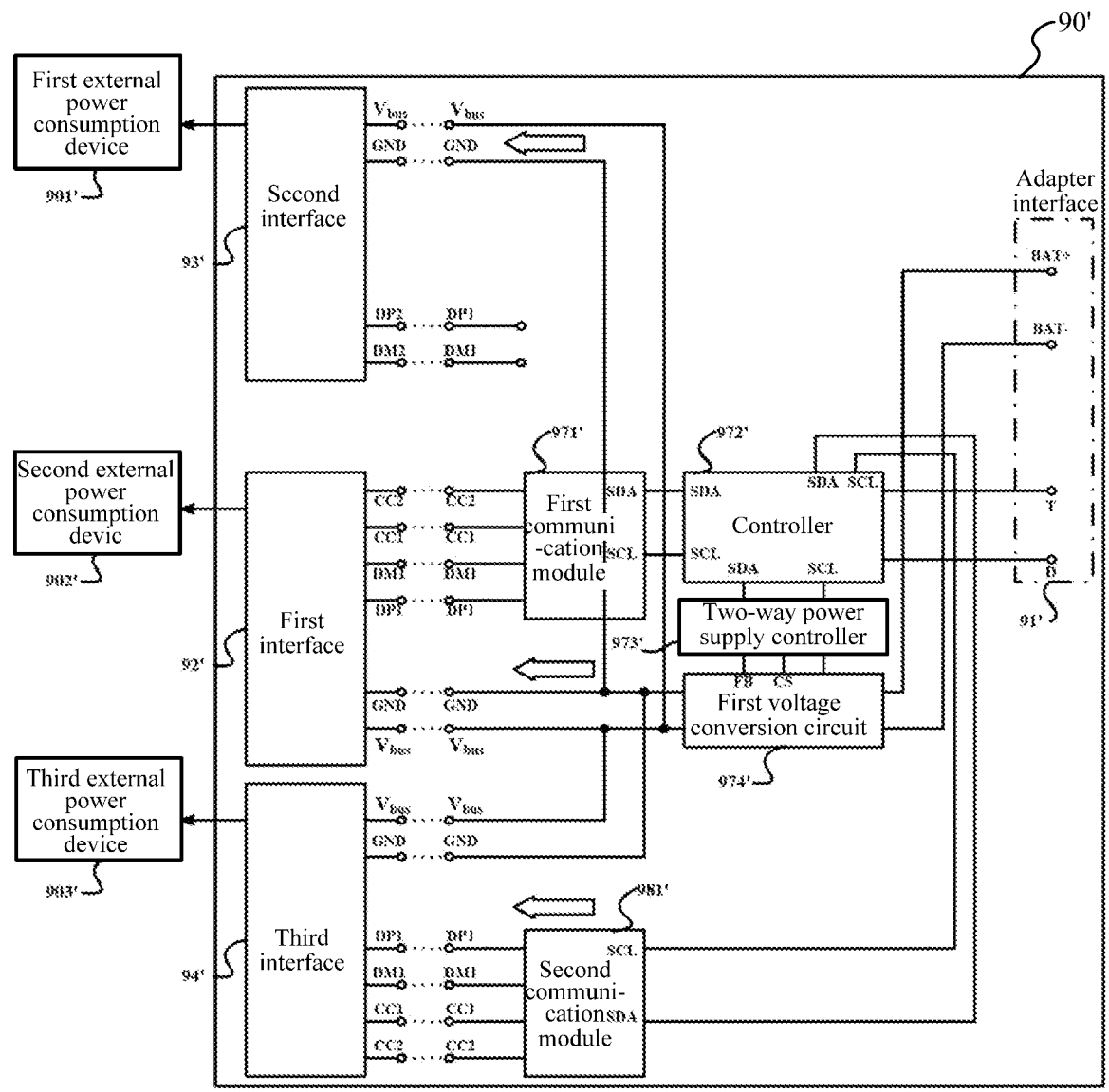
FIG. 14 is a circuit block diagram of the adapter in FIG. 3.

FIG. 14 shows an adapter 90' as one of the examples. The difference from the example shown in FIG. 13 is that a third direct current interface 94' and a first direct current interface 92' share a two-way power supply controller 973' and a first voltage conversion circuit 974'. Positive terminals of the first direct current interface 92', a second direct current interface 93', and the third direct current interface 94' are connected in series to the first voltage conversion circuit 974', and negative terminals of the first direct current interface 92', the second direct current interface 93', and the third direct current interface 94' are also connected in series to the first voltage conversion circuit 974'. Therefore, the first direct current interface 92', the second direct current interface 93', and the third direct current interface 94' can operate in the discharge mode at the same time with an operation power of 5 V/2 A. In the case where the first direct current interface 92' and the third direct current interface 94' operate in the charge mode, the first direct current interface 92' cannot operate.

Figure 15:
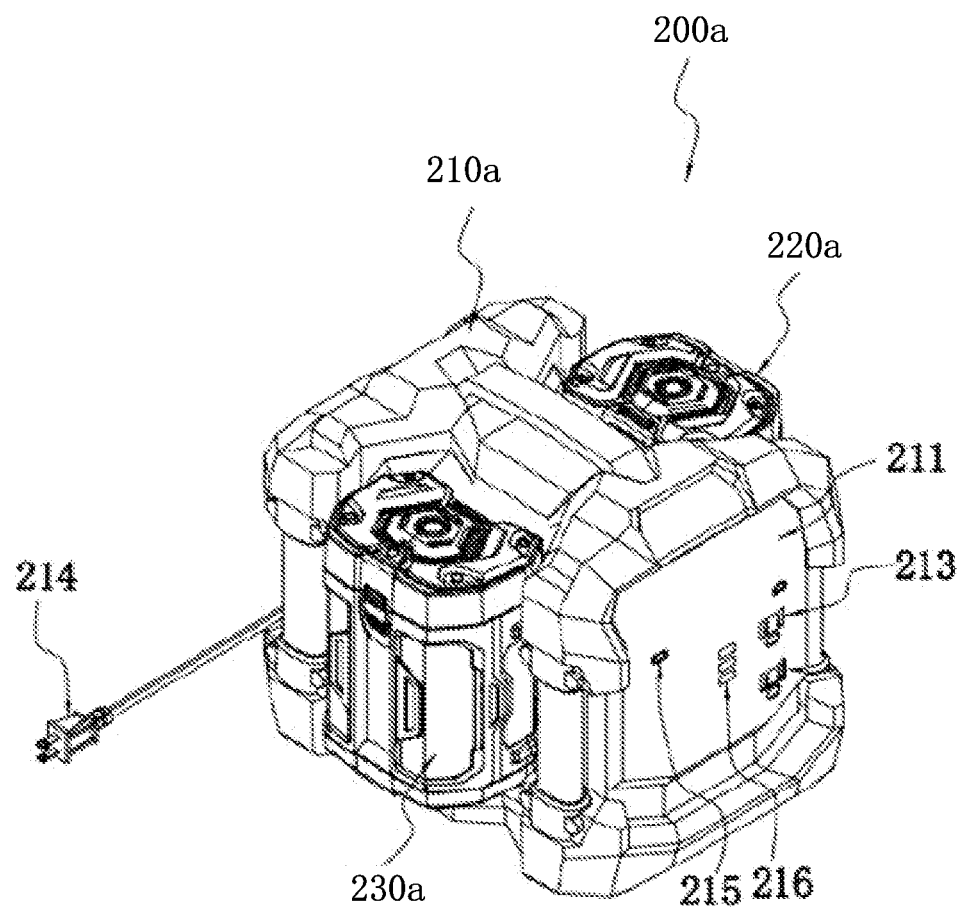
FIG. 15 is a structural view of a combination of a battery pack and an adapter according to an example.

FIG. 15 shows a combination 200a of a battery pack and an adapter as one of the examples, where the combination 200a of a battery pack and an adapter includes an adapter 210a and two battery packs 220a and 230a. In this example, the combination 200a of a battery pack and an adapter is a portable power system.

The battery pack 220a or the battery pack 230a may be the same or may be different, and both of the battery pack 220a and the battery pack 230a can supply power to a direct current power tool.

Figure 16:
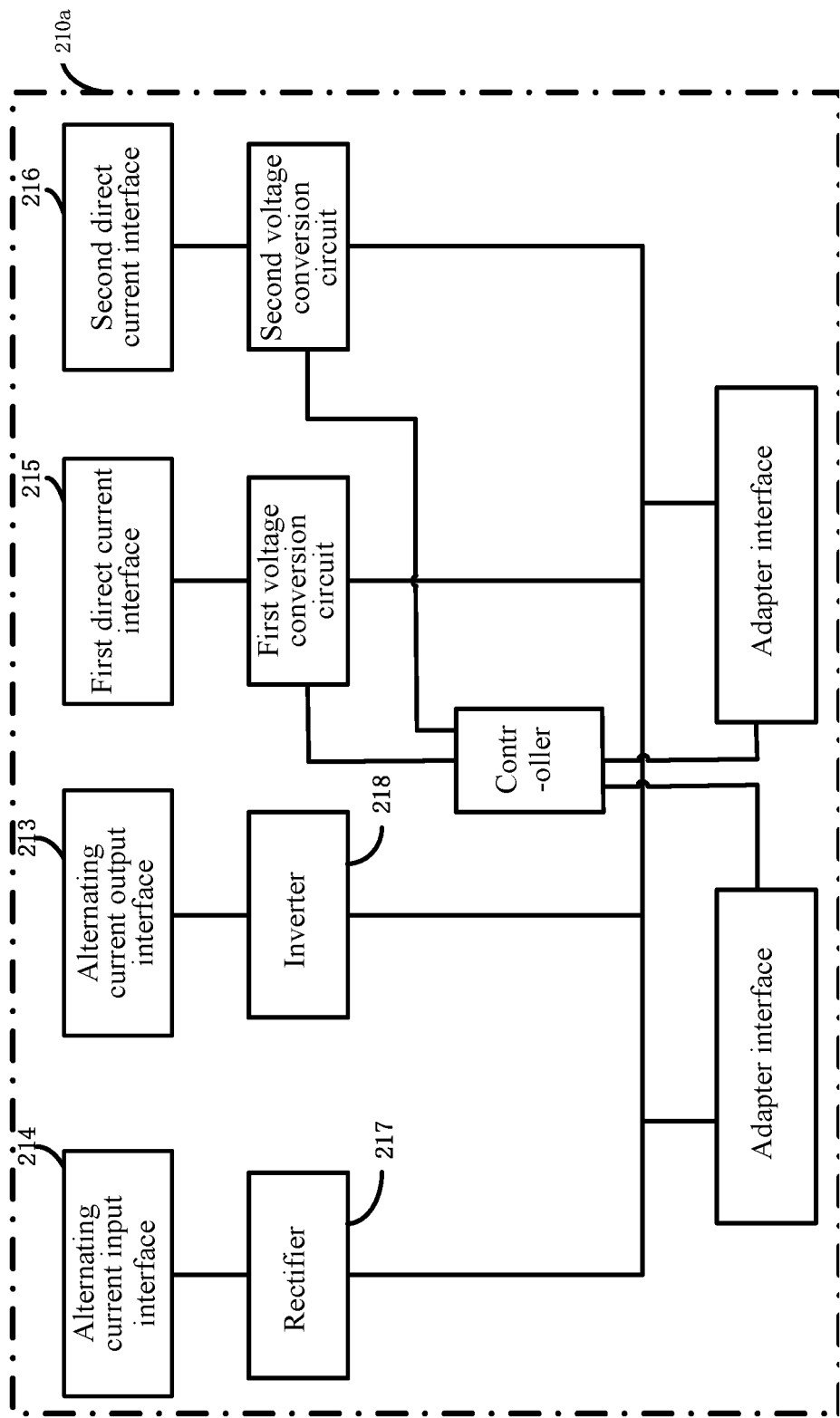
FIG. 16 is a circuit block diagram of the adapter in the combination of a battery pack and an adapter in FIG. 15.

The adapter 210a may include a casing 211, where the casing 211 is formed with an adapter interface that fits with a coupling portion of the battery pack 220a so that the battery pack can be detachably connected to the adapter 210a. Referring to FIG. 16, the adapter 210a further includes an inverter 218 and a rectifier 217, where the inverter 218 can convert the direct current output by the battery pack connected to the adapter 210a into the alternating current. The rectifier 217 can convert the alternating current accessed to the adapter 210a into the direct current that can charge the battery pack. Both the inverter 218 and the rectifier 217 are composed of corresponding circuit boards and circuit elements, and the circuit boards and circuit elements constituting the inverter are accommodated in an accommodation cavity formed by the casing 211.

The adapter 210a further includes an alternating current input interface 214 that enables the adapter 210a to access the alternating current in the power grid. In an example, the alternating current input interface 214 may be configured to be a power plug shown in FIG. 15, which has the advantage of ensuring the safety of electricity use; the alternating current input interface 214 may also be configured to be a general alternating current interface, which is convenient for a user to choose power cords of different lengths for a transfer. The adapter 210a can charge the battery pack connected to the adapter 210a through the accessed alternating current. The alternating current input interface 214 is electrically connected to the rectifier 217 so that the alternating current accessed to the alternating current input interface 214 is converted into the direct current, thereby charging the battery pack.

The adapter 210a further includes an alternating current output interface 213 configured to output the alternating current so that the combination 200a of a battery pack and an adapter can be used as an AC power supply. An electric power source of the alternating current output interface may be either the electric power stored in the battery pack connected to the adapter 210a, or the electric power accessed by the adapter 210a from elsewhere, such as the electric power, introduced from the alternating current input interface 214, of the alternating current power grid. The alternating current output interface may be constructed in the form of a power socket shown in FIG. 13, and the power socket may be designed to have the same specifications as a socket that outputs electric power from the local general grid so that the combination 200a of a battery pack and an adapter can supply power to the general AC power consumption device. The power sockets may be disposed on the same side of the adapter 210a or on different sides of the adapter 210a.

The adapter 210a can use the electric power of the battery pack to which the adapter 210a is connected and output the alternating current through the alternating current output interface. In an example, the alternating current output interface is at least electrically connected to the inverter 218, the inverter 218 is connected in series between the adapter interface and the alternating current output interface 213, and the direct current from the battery pack is converted into the alternating current through the converter 218 and outputted to the alternating current output interface 213.

The adapter 210a further includes a direct current interface, where the direct current interface is configured to be connected to an external power consumption device so that the adapter 210a outputs electric power. The voltage conversion circuit is connected in series between the direct current interface and the adapter interface and configured to convert the electric power of the battery pack into an electric power output adapted to the external power consumption device or convert electric power of an external power supply device into an electric power output adapted to the battery pack. In some examples, the adapter 210a includes a first direct current interface 215 and a second direct current interface 216. The first direct current interface 215 is the same type of interface as the first direct current interface 133 in the example shown in FIG. 6. The first direct current interface 215 is an interface that can achieve charge and discharge with a high power greater than 10 W, and the second direct current interface 216 is an interface with an operation power of 5 V/2 A. In an example, the first direct current interface 215 includes at least two power positive terminals, where the at least two power positive terminals are connected to a positive electrode of the external power consumption device or a positive electrode of the external power supply device.

In this manner, the first direct current interface 215 may be connected to a laptop adapter, a mobile phone charging terminal, or a mobile power supply, so as to charge the battery pack. The first direct current interface 215 can also charge a power consumption device such as a laptop and a mobile phone. The circuit design of at least two power positive terminals can bear greater power transmission, greatly improving the power transmission capacity of the first direct current interface 215, so that an output power or input power of the first direct current interface 215 is greater than 10 W, and thus the charging time or discharging time can be greatly shortened.

The adapter 210a further includes a control module connected between the direct current interface and the adapter interface and connected to the voltage conversion circuit, where the control module is configured to be capable of controlling a current direction and an output voltage of the voltage conversion circuit according to a signal state of the direct current interface and a signal state of the adapter interface.

Figure 17:
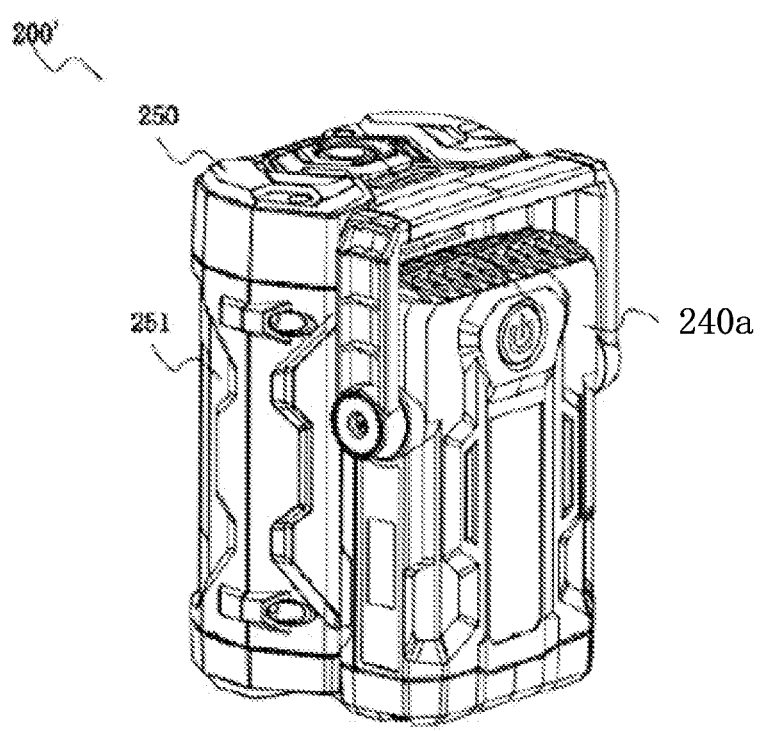
FIG. 17 is a structural view of a combination of a battery pack and an adapter according to an example.
Figure 18:
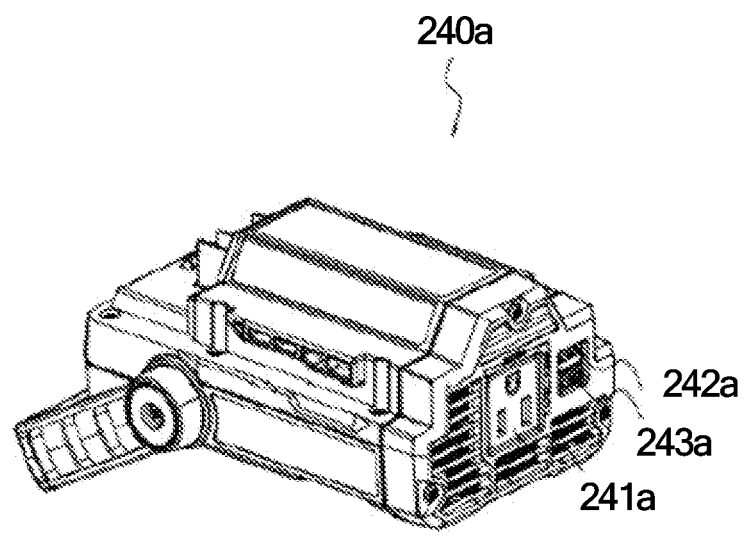
FIG. 18 is a structural view of the adapter in the combination of a battery pack and an adapter in FIG. 17.
Figure 19:
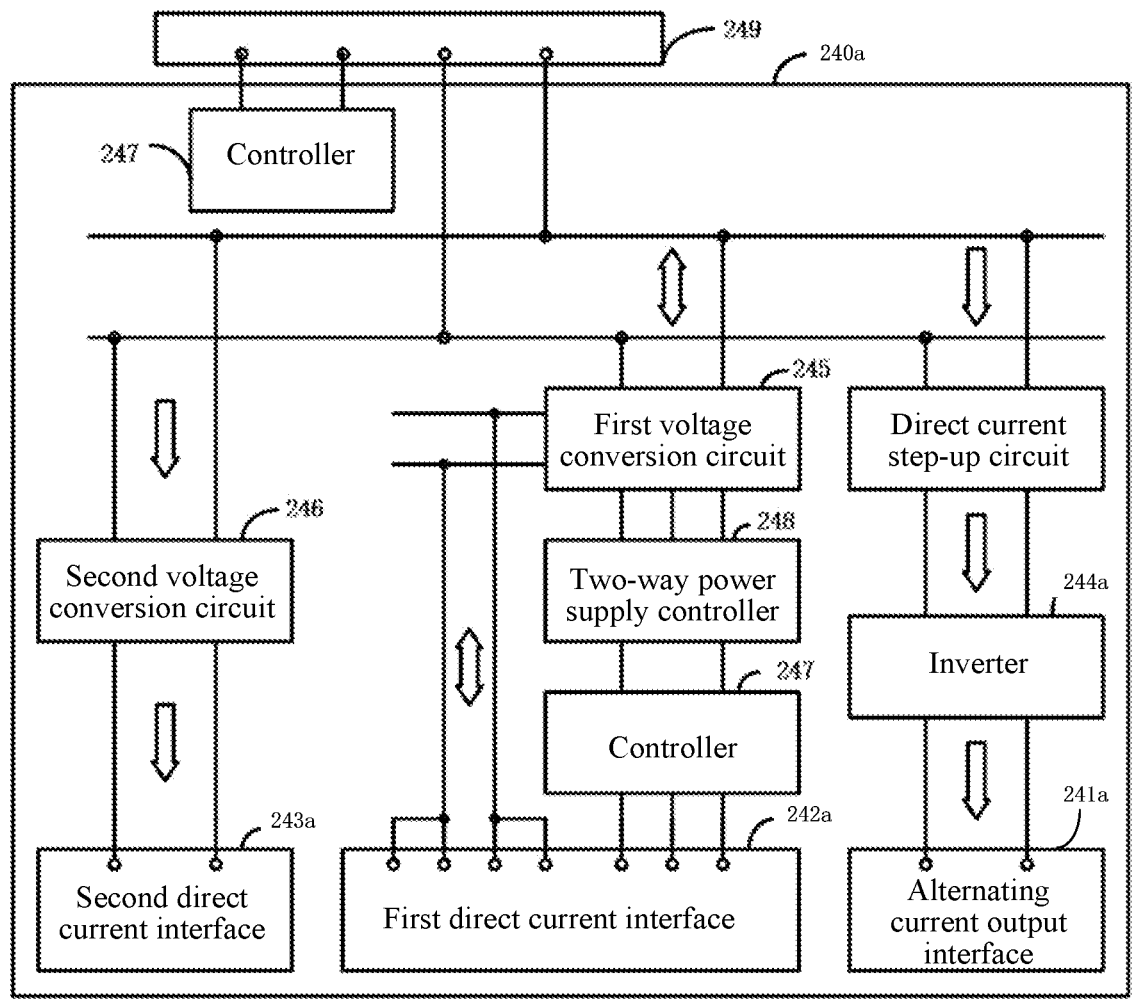
FIG. 19 is a circuit block diagram of the adapter in FIG. 18.

Referring to FIGS. 17 to 19, a combination 200' of a battery pack and an adapter includes an adapter 240a and a battery pack 250. In this example, the combination 200' of a battery pack and an adapter is a portable power system.

The battery pack 250 can supply power to a direct current power tool. In an example, the battery pack 250 includes a cell and a first casing 251, where the cell is accommodated in the first casing 251. The cell is configured to store energy and can be repeatedly charged and discharged. A lithium-ion battery or a graphene battery may be selected for the cell. The first casing 251 is configured to accommodate the cell and other components in the battery pack 250, and the first casing 251 is formed with a coupling portion through which the battery pack 250 can be coupled to a power tool.

The adapter 240a may be coupled to the battery pack 250 described above so that the battery pack 250 can output the alternating current and/or the direct current through the adapter 240a.

Referring to FIGS. 18 and 19, the adapter 240a further includes an alternating current output interface 241a configured to output the alternating current so that the combination 200' of a battery pack and an adapter may be used as an AC power supply. The alternating current output interface 241a is electrically connected to an inverter 244a and configured to output the alternating current. In some examples, the alternating current output interface 241a is constructed in the form of a power socket shown in FIG. 18, and the power socket is designed to have the same specifications as a socket that outputs electric power from the local general grid so that the portable power system can supply power to the general AC power consumption device. In some examples, the adapter 200 includes the alternating current output interface 241a configured to output 110 V to 130 V alternating current or 210 V to 230 V alternating current. In some examples, the adapter 240a includes two alternating current output interfaces 241a configured to output 110 V to 130 V alternating current or 210 V to 230 V alternating current, respectively.

The adapter 240*a* further includes a voltage conversion circuit and a direct current interface. In some examples, the adapter 240*a* includes a first direct current interface 242*a*, where the first direct current interface 242*a* is the same type of interface as the first direct current interface 133 in the example shown in FIG. 6 and configured to be connected to the external power consumption device so that the adapter 240*a* outputs electric power or configured to be connected to the external power supply device so that the battery pack is charged. In other examples, the adapter 240*a* includes a first direct current interface 242*a* and a second direct current interface 243*a*. In an example, the adapter 240*a* further includes a first voltage conversion circuit 245 and a second voltage conversion circuit 246 configured to convert the direct current output by the battery pack 250 into a direct current output with a preset voltage. The first voltage conversion circuit 245 may also be configured to convert the electric power of the external power supply device into the electric power adapted to the battery pack. The first direct current interface 242*a* includes at least two power positive terminals, where the at least two power positive terminals are connected to a positive electrode of the external power consumption device or a positive electrode of the external power supply device. The first direct current interface 242*a* is an interface that can achieve charge and discharge with a high power greater than 10 W, and the second direct current interface 243*a* is an interface with an operation power of 5 V/2 A.

The first direct current interface 242*a* may be connected to a laptop adapter, a mobile phone charging terminal, or a mobile power supply, so as to charge the battery pack, and the first direct current interface 242*a* may also be connected to a power supply device so that a power consumption device such as a laptop or a mobile phone is charged. In this manner, the circuit design of at least two power positive terminals in the first direct current interface can bear greater power transmission, greatly improving the power transmission capacity of the first direct current interface 242*a*, so that an output power or input power of the first direct current interface 242*a* is greater than 10 W, and thus the charging time or discharging time can be greatly shortened.

The adapter 240*a* further includes a controller 247 and a two-way power supply controller 248. The controller 247 is connected between the first direct current interface 242*a* and an adapter interface 249. The two-way power supply controller 248 is connected between the controller 247 and the first voltage conversion circuit 245. The controller 247 is configured to be capable of outputting a control signal to the two-way power supply controller 248 according to the signal state of the direct current interface and the signal state of the adapter interface to control a current direction and an output voltage of the first voltage conversion circuit 245 so that the external power supply device charges the battery pack or the battery pack is discharged to supply power to the external power consumption device.

In the preceding example of the present application, in the combination of a battery pack and an adapter, the circuitry architecture of FIGS. 7 to 11, FIG. 13, and FIG. 14 may be used as the circuitry architecture of the direct current interface, which is not limited herein.

In this manner, the combinations 200 and 200' of a battery pack and an adapter are often used as small and medium charging stations for outdoor operations with an output power greater than 100 W, such as 150 W, 300 W, 1200 W, and 2000 W, which is not limited herein. If this combination of a battery pack and an adapter with a high power can be designed to be capable of flexibly interacting with various available equipment on site, such as external power supply devices that provide the alternating current and/or the direct current and external power consumption devices that require the alternating current and/or the direct current to acquire electric power from each other, the usage scenarios of the power supply device can be greatly expanded.

Figure 20:
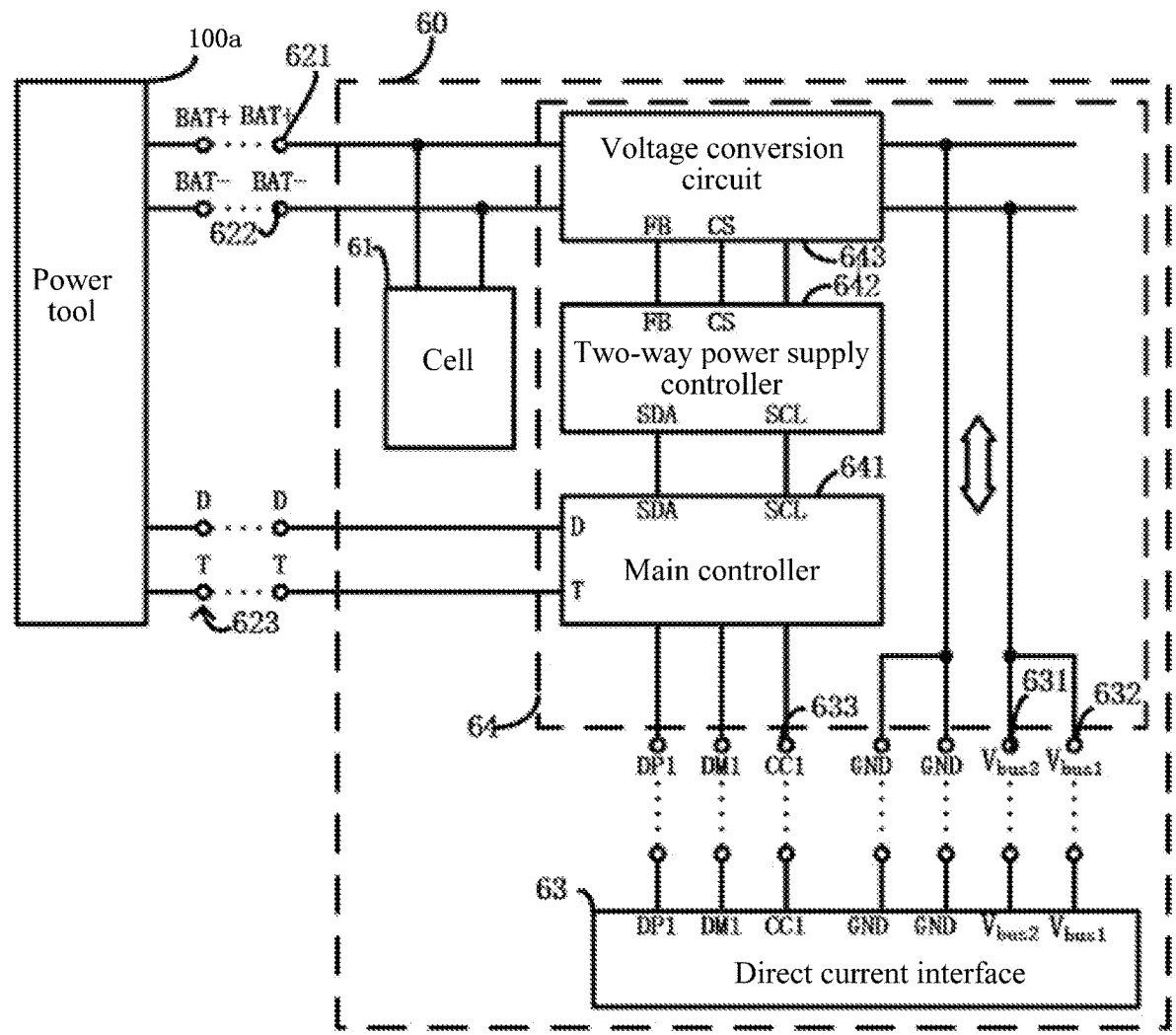
FIG. 20 is a circuit block diagram of a battery pack according to an example.

In some examples, referring to FIG. 20, a battery pack 60 is configured to supply power to a power tool 100*a* and detachably connected to the power tool 100*a*. The battery pack 60 includes a cell 61 and battery pack terminals, where the cell 61 is configured to store electric power, and the battery pack terminals include a positive terminal 621 of the battery pack, a negative terminal 622 of the battery pack, and a communication terminal 623. The battery pack outputs electric power through the positive terminal 621 of the battery pack and the negative terminal 622 of the battery pack.

The battery pack further includes a direct current interface 63 and a circuit board unit 64. The direct current interface 63 may be selectively connected to an external power consumption device or an external power supply device. In this manner, in the case where the direct current interface 63 is in the charge state, the direct current interface 63 receives electric power from the external power supply device; and in the case where the direct current interface 63 is in the discharge state, the direct current interface 63 supplies electric power of the battery pack to the external power consumption device.

The direct current interface 63 includes at least two power positive terminals, that is, a first power terminal 631 and a second power terminal 632, such as Vbus1 and Vbus2, and the direct current interface 63 further includes a detection terminal 633, such as CC1. The first power terminal 631 and the second power terminal 632 can be connected to a positive terminal of the external power consumption device or a positive terminal of the external power supply device for inputting or outputting electric power.

The detection terminal 633 is configured to detect a state signal of the direct current interface, where the direct current interface 63 has a charge state, a discharge state, and an empty state. In the case where the direct current interface 63 is connected to the external power supply device, the detection terminal 633 detects a high level, the external power supply device is equivalent to a pull-up resistor, it is determined that the direct current interface 63 is a power supply side, the cell 61 is equivalent to a pull-down resistor and determined as a power receiving side, and the detection terminal 633 determines that the direct current interface 63 is in the charge state and sends a charge control signal to the circuit board unit 64 so that the external power supply device charges the battery pack 60. In the case where the direct current interface 60 is connected to the external power consumption device, the detection terminal 633 detects a low level, the external power consumption device is equivalent to a pull-down resistor, it is determined that the direct current interface 63 is a power receiving side, the cell 61 is equivalent to a pull-up resistor and determined as a power supply side, and the detection terminal 633 determines that the direct current interface 63 is in the discharge state and sends a discharge control signal to the circuit board unit 64 so that the battery pack 60 is discharged to supply power to the external power consumption device.

The circuit board unit 64 is connected in series between battery pack terminals 62 and the direct current interface 63. As an example, a main controller 641, a two-way power supply controller 642, and a voltage conversion circuit 643 are disposed on the circuit board unit. The circuit board unit

64 may be one circuit board or may be integrated by multiple circuit boards, which is not limited herein.

In the case where the direct current interface 63 is connected to the external power supply device, the detection terminal 633 detects that the direct current interface 63 is in the charge state and sends the charge control signal to the main controller 641. The main controller 641 is configured to receive the charge control signal from the detection terminal 633, and the main controller 641 can further receive a communication signal of related information from the power tool 100*a*.

The main controller 641 outputs a control signal to the two-way power supply controller 642 according to the charge control signal; the two-way power supply controller 642 receives the control signal from the main controller 641 and outputs a power supply control signal to the voltage conversion circuit 643 to control a current direction of the voltage conversion circuit 643 and control the voltage conversion circuit 643 to adjust the electric power of the external power supply device to form an electric power output adapted to a cell group and/or the power tool so that the external power supply device supplies power to the battery pack and/or the power tool.

In the case where the direct current interface is connected to the external power consumption device, the detection terminal 633 detects that the direct current interface 63 is in the discharge state and sends the discharge control signal to the main controller 641. The main controller 641 is configured to receive the discharge control signal from the detection terminal 633 and output a control signal to the two-way power supply controller 642; the two-way power supply controller 642 receives the control signal from the main controller 641 and outputs a power supply control signal to the voltage conversion circuit 643 to control the current direction of the voltage conversion circuit 643 such that the voltage conversion circuit 643 matches a discharge voltage of the cell 61 with a charge voltage required by the external power consumption device and thus the external power consumption device is charged.

In this manner, an external power supply device of a smartphone or a laptop available on site may be used for charging the battery pack with a high power through the direct current interface, and the battery pack may also output the electric power stored in the cell group to charge an external power consumption device such as the smartphone or the laptop. In this manner, the usage scenarios of the battery pack are expanded and thus the battery pack is convenient for a user to use. Since a design circuit architecture of the two-way power supply controller is adopted in the battery pack, the charge and discharge control can be achieved through the same controller, which reduces the introduction of other operational amplifier circuits and simplifies the circuit structure. Moreover, the battery pack can achieve charge and discharge with a high power greater than 10 W through the direct current interface.

Figure 21:
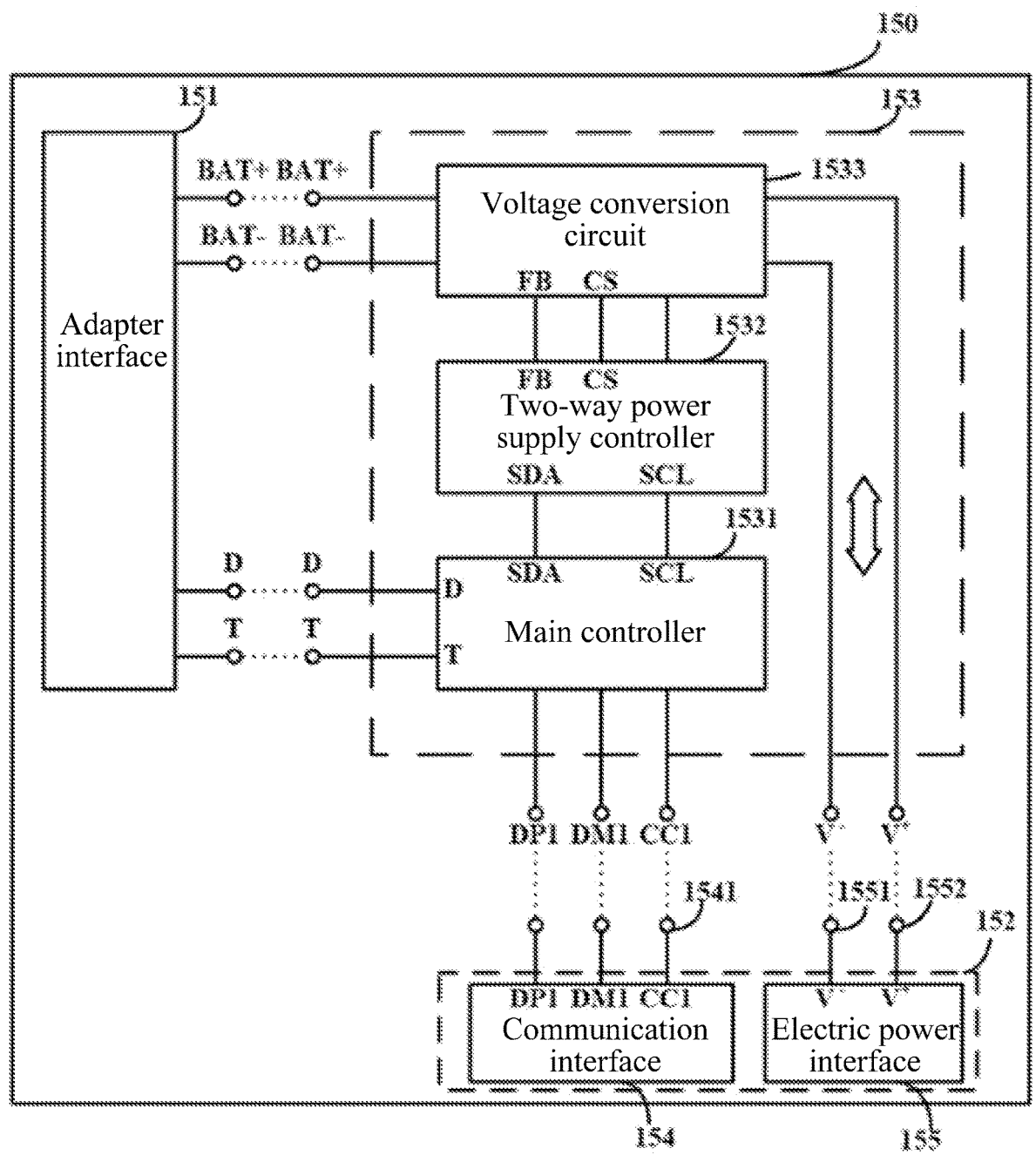
FIG. 21 is a circuit block diagram of an adapter according to an example.

In other examples, referring to an adapter 150 shown in FIG. 21, the adapter 150 includes an adapter interface 151, an interface assembly 152, and a circuit board unit 153. The interface assembly 152 includes a communication interface 154 and an electric power interface 155. The adapter interface 151 is configured to be electrically connected to the battery pack to access the direct current. The interface assembly 152 can be selectively connected to an external power consumption device or an external power supply device to selectively make the external power supply device charge the battery pack or make the battery pack discharged to supply power to the external power consumption device.

The external power consumption device may be a hand-held power tool or a garden power tool such as a vehicle-type lawn mower and a hair dryer, which is not limited herein. The external power supply device may be an adapter.

In an example, the communication interface 154 is configured to communicate with the circuit board unit 153. The electric power interface 155 can be electrically connected to the circuit board unit 153 for inputting or outputting electric power. The electric power interface 155 includes a power positive terminal 1551 and a power negative terminal 1552. In some examples, nickel sheets are used as the power positive terminal 1551 and the power negative terminal 1552 to input and output the direct current. A standard voltage range of the electric power interface 155 is 0V to 200V, which can achieve a continuously adjustable voltage from 0V to 200V and support any relatively large source output power of 6000 W.

The communication interface 154 is provided with a detection terminal 1541, where the detection terminal 1541 is configured to detect a signal state of the interface assembly 152. The interface assembly 152 has a charge state, a discharge state, and an empty state. In the case where the external power supply device is connected to the adapter, the detection terminal 1541 detects a high level, the external power supply device is equivalent to a pull-up resistor, it is determined that the electric power interface is a power supply side, the battery pack is equivalent to a pull-down resistor and determined as a power receiving side, and the detection terminal 1541 determines that the interface assembly 152 is in the charge state and sends a charge control signal to the circuit board unit 153 so that the external power supply device charges the battery pack. In the case where the external power consumption device is connected to the adapter, the detection terminal 1541 detects a low level, the external power consumption device is equivalent to a pull-down resistor, it is determined that the electric power interface 155 is a power receiving side, the battery pack is equivalent to a pull-up resistor and determined as a power supply side, and the detection terminal 1541 determines that the interface assembly is in the discharge state and sends a discharge control signal to the circuit board so that the battery pack is discharged to supply power to the external power consumption device.

The circuit board unit 153 is connected in series between the adapter interface 151 and the communication interface 154. As an example, a main controller 1531, a two-way power supply controller 1532, and a voltage conversion circuit 1533 are disposed on the circuit board unit 153. The circuit board unit 153 may be one circuit board or may be integrated by multiple circuit boards, which is not limited herein.

In an example, in the case where the interface assembly 152 is connected to the external power supply device, the detection terminal 1541 detects that the interface assembly 152 is in the charge state and sends the charge control signal to the main controller 1531. The main controller 1531 also receives a communication signal of related information of the battery pack from the battery pack and outputs a control signal to the two-way power supply controller 1532. The two-way power supply controller 1532 is configured to output a power supply control signal to the voltage conversion circuit 1533 according to the received control signal from the main controller 1531 to control a current direction of the voltage conversion circuit 1533 and control the voltage conversion circuit 1533 to adjust the electric power of the external power supply device to form an electric power output adapted to the battery pack so that the external power supply device charges the battery pack. In other examples, in the case where the interface assembly 152 is connected to the external power consumption device, the detection terminal 1541 detects that the interface assembly 152 is in the discharge state and sends the discharge control signal to the main controller 1531. The main controller 1531 also receives the communication signal of the related information of the battery pack from the battery pack and outputs a control signal to the two-way power supply controller 1532. The two-way power supply controller 1532 receives the control signal and controls the current direction of the voltage conversion circuit 1533, and the voltage conversion circuit 1533 matches a discharge voltage of the battery pack with a charge voltage required by the external power consumption device so that the external power consumption device is charged.

In an example, the communication interface 154 and the electric power interface 155 may also be integrated into one interface, which is not limited herein.

In this manner, power transmission with a higher voltage can be performed through the adapter, thereby greatly shortening the charging time of the battery pack. It can be applied to the common 36 V, 48 V, 54 V battery packs in the field of power tools. Moreover, the communication interface is provided so that the communication transmission is more stable. In addition, through the adapter, the battery pack can supply power to a power tool whose rated voltage is not adapted to a rated voltage of the battery pack. For example, a battery pack with a rated voltage of 48 V can supply power to a power tool with a rated voltage of 24 V or a battery pack with a rated voltage of 24 V can supply power to a power tool with a rated voltage of 18 V. In this manner, the usage scenarios of the battery pack are expanded and thus the battery pack is convenient for a user to use.

Figure 1:
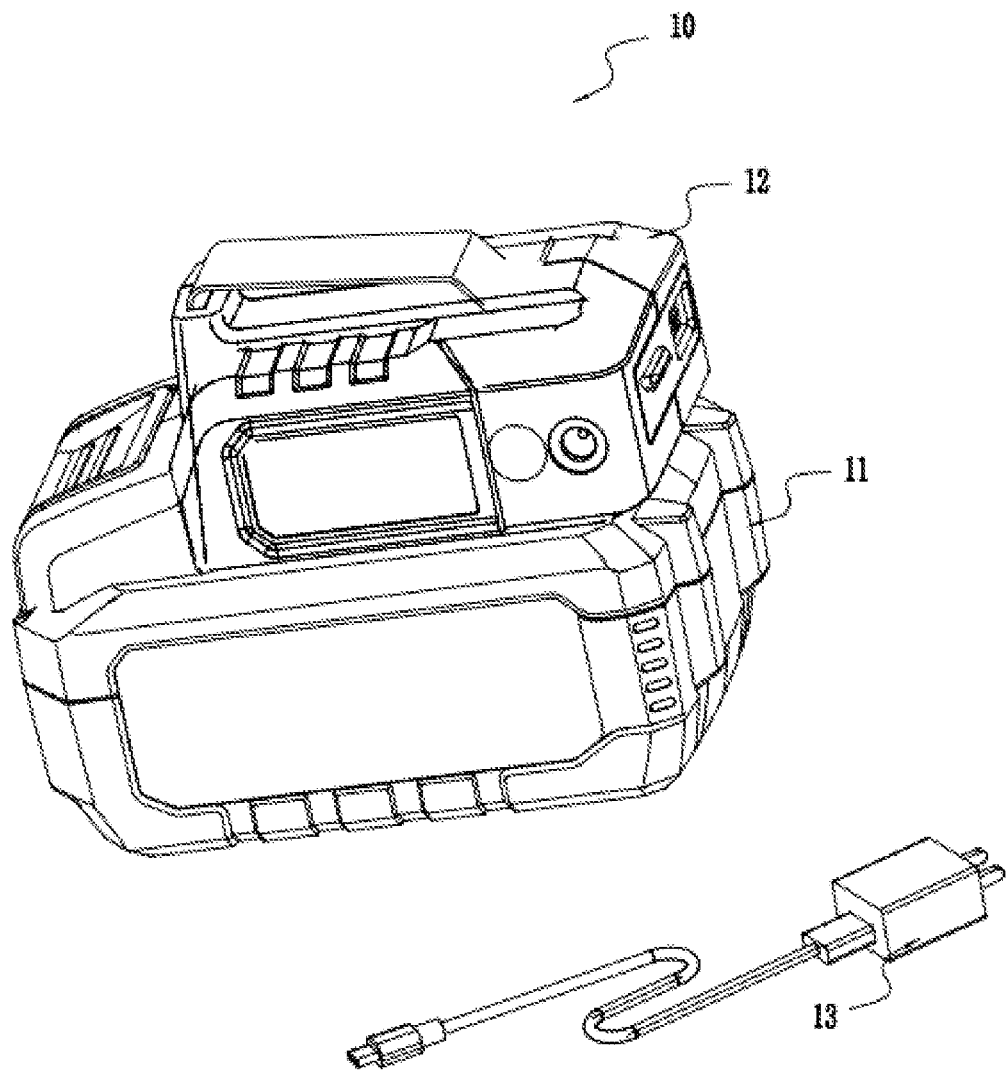
FIG. 1 is a structural view of a combination of a battery pack and an adapter according to an example.

As shown in FIG. 1, a combination of a battery pack 100 and a tool lamp 200 in an example of the present application includes the battery pack 100 and the tool lamp 200. The battery pack 100 is configured to supply power to the tool lamp 200 and includes a cell for storing electric power and at least one battery pack interface 110 that can be detachably connected to the tool lamp 200, where the battery pack interface 110 is provided with a battery pack terminal electrically connected to the tool lamp 200.

Figure 22:
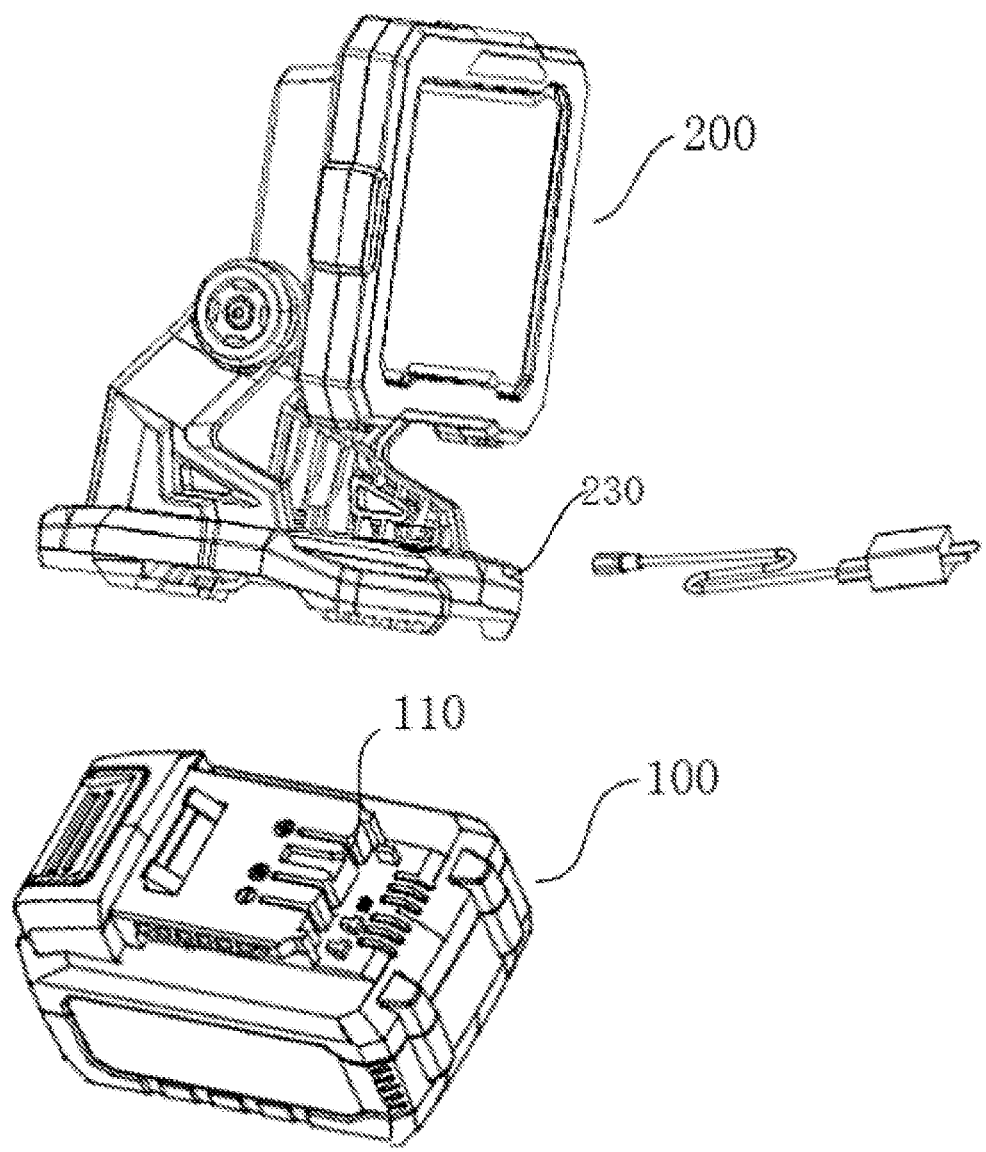
FIG. 22 is a structural view of a combination of a battery pack and a tool lamp according to an example.
Figure 23:
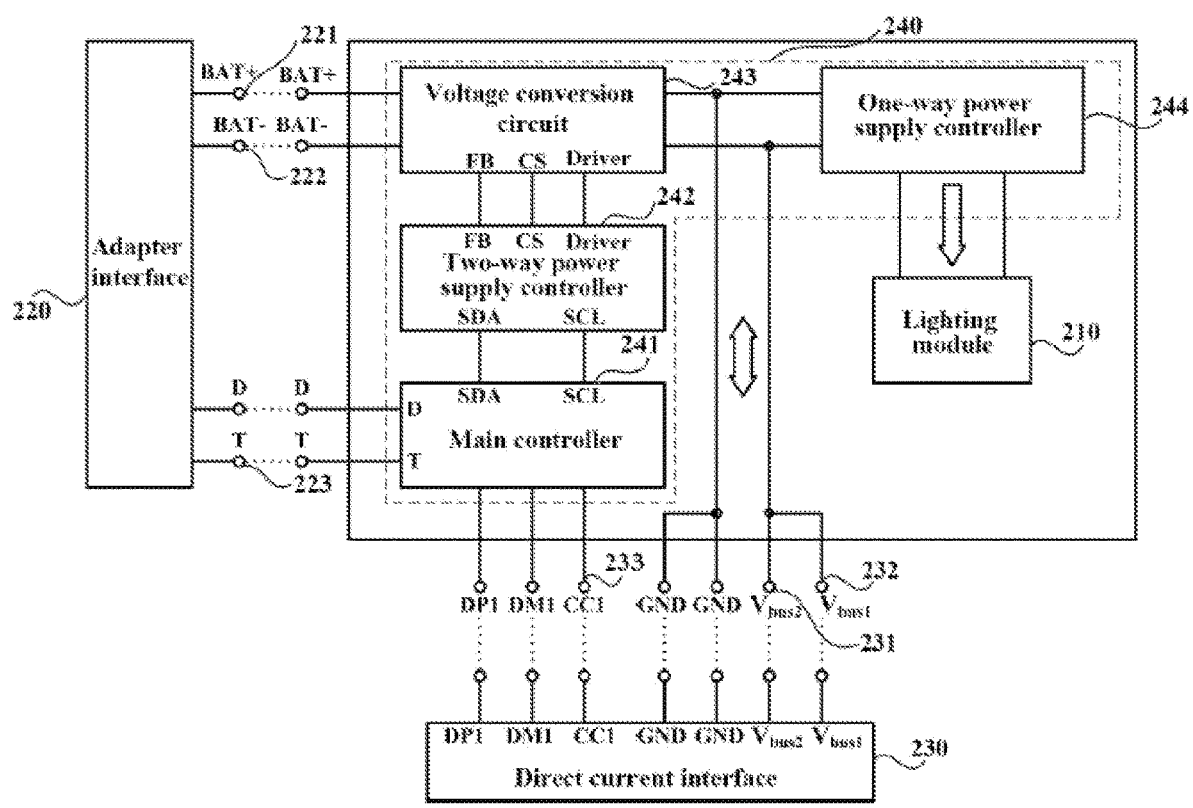
FIG. 23 is a circuit block diagram of the tool lamp in FIG. 22.

As shown in FIG. 22, the tool lamp 200 is specifically a hand-held lighting lamp. Referring to FIG. 23, the tool lamp 200 includes a lighting module 210, an adapter interface 220, a direct current interface 230, and a circuit board unit 240.

The lighting module 210 is a light-emitting diode (LED) light-emitting module. Of course, the lighting module 210 may also be configured to be other light-emitting units, as long as a lighting function is satisfied, which is not limited herein.

The adapter interface 220 is configured to be detachably connected to the battery pack interface 110 of the battery pack 100. The adapter interface 220 includes an adapter positive terminal 221, an adapter negative terminal 222, and an adapter communication terminal 223, where the adapter positive terminal 221 and the adapter negative terminal 222 are electrically connected to the battery pack terminal.

Referring to FIG. 23, the direct current interface 230 is configured to be capable of being selectively connected to an external power consumption device or an external power supply device. In the case where the direct current interface 230 is in a charge state, electric power from the external power supply device is received; and in the case where the direct current interface 230 is in a discharge state, electric power of the battery pack 100 is supplied to the external power consumption device.

The direct current interface 230 includes a detection terminal 233 and an electric power terminal, where the detection terminal 233 detects a state signal of the direct current interface 230, and the electric power terminal is configured to output or input electric power.

The electric power terminal of the direct current interface 230 includes at least two power positive terminals. Two power positive terminals are a first electric power terminal 231 and a second electric power terminal 232, respectively, such as Vbus1 and Vbus2. The first electric power terminal 231 and the second electric power terminal 232 can be connected to a positive terminal of the external power consumption device or a positive terminal of the external power supply device and are configured to input or output electric power.

The output or input power of the direct current interface is P, where P≤100 W; or 100 W≤P≤200 W; or 200 W≤P≤500 W.

The output or input voltage of the direct current interface is U, where U≤20 V; or 20 V≤U≤60 V; or 60 V≤U≤100V.

The direct current interface 230 further includes the detection terminal 233 such as CC1. The detection terminal 233 is configured to detect the state signal of the direct current interface 230, where the direct current interface 230 has the charge state, the discharge state, and an empty state.

Specifically, in the case where the direct current interface 230 is connected to the external power supply device, the detection terminal 233 detects a high level, the external power supply device is equivalent to a pull-up resistor, it is determined that the direct current interface 230 is a power supply side, the battery pack 100 is equivalent to a pull-down resistor and determined as a power receiving side, and the detection terminal 233 determines that the direct current interface 230 is in the charge state and sends a charge control signal to the circuit board unit 240 so that the external power supply device charges the battery pack 100.

In the case where the direct current interface 230 is connected to the external power consumption device, the detection terminal 233 detects a low level, the external power consumption device is equivalent to a pull-down resistor, it is determined that the direct current interface 230 is a power receiving side, the battery pack 100 is equivalent to a pull-up resistor and determined as a power supply side, and the detection terminal 233 determines that the direct current interface 230 is in the discharge state and sends a discharge control signal to the circuit board unit 240 so that the battery pack 100 is discharged to supply power to the external power consumption device.

The circuit board unit 240 is connected in series between the adapter interface 220 and the direct current interface 230; the circuit board unit 240 includes a two-way control module and a one-way control module. The circuit board unit 240 may be one circuit board or may be integrated by multiple circuit boards, which is not limited herein.

The two-way control module is connected in series between the direct current interface 230 and the adapter interface 220, where the two-way control module is configured to adjust electric power of the external power supply device according to a control signal of the direct current interface 230 to form an electric power input adapted to the battery pack 100 so that the external power supply device charges the battery pack 100; or the two-way control module is configured to match a discharge voltage of the battery pack 100 with a power supply voltage required by the external power consumption device according to the control signal of the direct current interface 230 so that the external power consumption device is powered.

As a specific example, the two-way control module includes a main controller 241, a two-way power supply controller 242, and a voltage conversion circuit 243 that are disposed on the circuit board unit 240.

In the case where the direct current interface 230 is connected to the external power supply device, the detection terminal 233 detects a charge signal and determines that the direct current interface 230 is in the charge state, and the detection terminal 233 sends the charge control signal to the main controller 241; the main controller 241 outputs a control signal to the two-way power supply controller 242 according to the charge control signal; the two-way power supply controller 242 receives the control signal from the main controller 241 and outputs a power supply control signal to the voltage conversion circuit 243 to control a current direction of the voltage conversion circuit 243 and control the voltage conversion circuit 243 to adjust the electric power of the external power supply device to form the electric power input adapted to the battery pack 100 so that the external power supply device supplies power to the battery pack 100.

The main controller 241 can also receive related communication signals from the adapter communication terminal 223 of the battery pack 100 to send power supply information adapted to the battery pack 100 to the main controller 241, such as voltage and current information. The main controller 241 sends the control signal to the two-way power supply controller 242 according to the power supply information, and finally, the two-way power supply controller 242 outputs the power supply control signal to the voltage conversion circuit 243 to adjust electric power input by the external power supply device to the battery pack 100.

In the case where the direct current interface 230 is connected to the external power consumption device, the detection terminal 233 detects a discharge signal and determines that the direct current interface 230 is in the discharge state, and the detection terminal 233 sends the discharge control signal to the main controller 241; the main controller 241 outputs a control signal to the two-way power supply controller 242 according to the discharge control signal; the two-way power supply controller 242 receives the control signal from the main controller 241 and outputs a power supply control signal to the voltage conversion circuit 243 to control a current direction of the voltage conversion circuit 243, and the voltage conversion circuit 243 matches the discharge voltage of the battery pack 100 with the power supply voltage required by the external power consumption device so that the external power consumption device is powered.

In this manner, an external power supply device of a smartphone or a laptop available on site may be used to supply power to the battery pack 100 through the direct current interface, and the battery pack 100 may also output the electric power stored in the cell to supply power to an external power consumption device such as the smartphone or the laptop. It is to be understood that the power supply includes a case where electric power is directly supplied to the external power consumption device for its use and a case where the external power consumption device is charged.

The tool lamp in the present application is provided with the direct current interface, the two-way control module, and the one-way control module, which expands the use of the tool lamp and is convenient for a user to use. It is to be understood that since a design circuit architecture of the two-way power supply controller is adopted in the tool lamp, the charge and discharge control can be achieved through the same controller, which reduces the introduction of other operational amplifier circuits and simplifies the circuit structure.

The one-way control module is connected in series between the direct current interface 230 and the lighting module 210 and connected in series between the adapter interface 220 and the lighting module 210, where the one-way control module is configured to convert the electric power of the external power supply device or the electric power of the battery pack 100 into an electric power input adapted to the lighting module 210.

The one-way control module includes a one-way power supply controller 244 disposed on the circuit board unit 240 and connected in series between the direct current interface 230 and the lighting module 210. In the case where the direct current interface 230 is connected to the external power supply device, the one-way power supply controller 244 receives and adjusts the electric power from the external power supply device to form the electric power input adapted to the lighting module 210 so that the external power supply device supplies power to the lighting module 210.

The one-way power supply controller 244 is also connected in series between the voltage conversion circuit 243 and the lighting module 210. In the case where the adapter interface 220 is connected to the battery pack 100, the one-way power supply controller 244 receives and adjusts the electric power of the battery pack 100 to form the electric power input adapted to the lighting module 210 so that the battery pack 100 supplies power to the lighting module 210.

It is to be understood that the tool lamp may be connected to the external power supply device or the external power consumption device through an adapter, and the adapter can make the tool lamp output electric power and can also supply electric power to charge the tool lamp and/or the battery pack. As shown in FIG. 22, the adapter may include a power plug and an output interface; of course, the adapter may also include an input interface and an output interface that are configured to be connected to the tool lamp and the external power supply device or the external power consumption device, respectively.

An operation process of the tool lamp in the present application is described below.

A: the case where the direct current interface 230 is connected to the external power supply device.

If the battery pack 100 is not connected to the adapter interface 220, the external power supply device supplies power to the lighting module 210 through the one-way control module, and the lighting module 210 can perform lighting. In this case, the adapter interface 220 is not powered on.

If the battery pack 100 is connected to the adapter interface 220, the main controller 241 receives a signal from the adapter communication terminal 223 of the battery pack 100, the external power supply device supplies power to the lighting module 210 through the one-way control module, and the external power supply device charges the battery pack 100 through the two-way control module. For a process of charging the battery pack 100 by the external power supply device, reference may be made to the preceding related description, which is not repeated herein.

B: the case where the direct current interface is connected to the external power consumption device.

In this case, the battery pack 100 is connected to the adapter interface 220, and the battery pack 100 supplies power to the external power consumption device through the two-way control module; when there is a requirement for lighting, the battery pack 100 can also supply power to the lighting module 210 through the one-way control module, and the lighting module 210 can perform lighting.

C: the case where no device is connected to the direct current interface.

In this case, the battery pack 100 supplies power to the lighting module 210. In the case where the battery pack 100 is connected to the adapter interface 220, the lighting module 210 can perform lighting.

Figure 24:
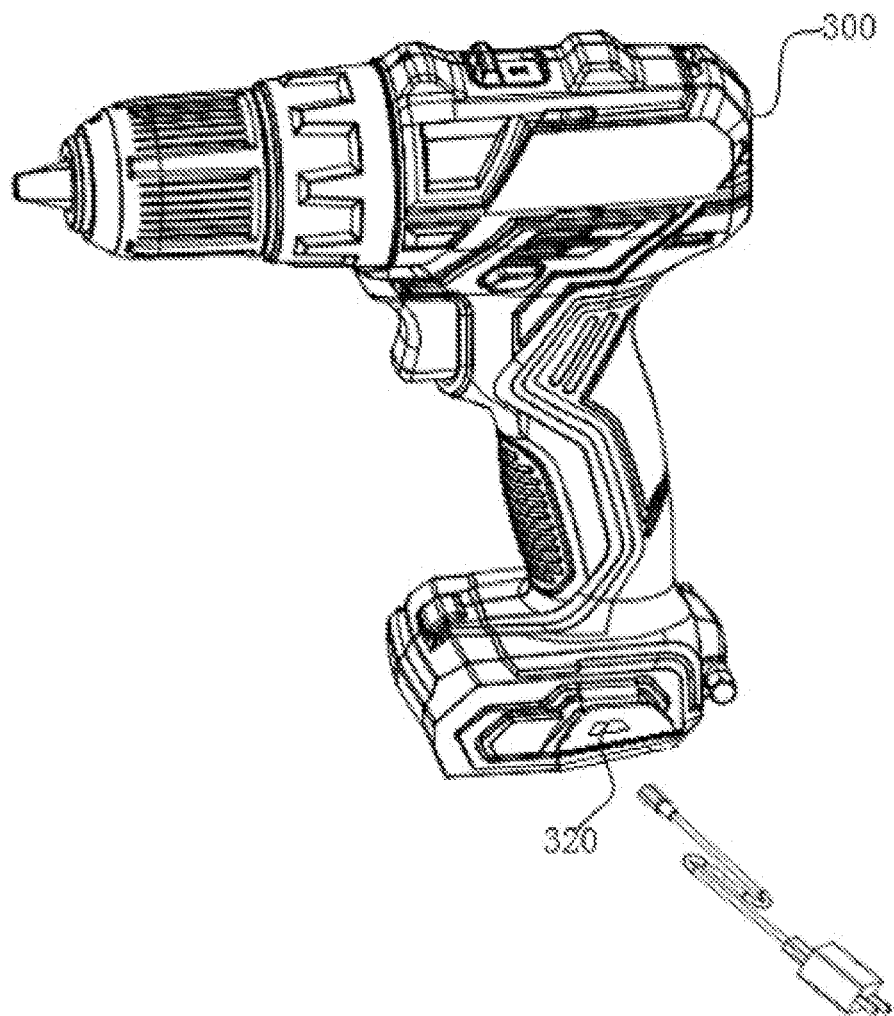
FIG. 24 is a structural view of a power tool according to another example.
Figure 25:
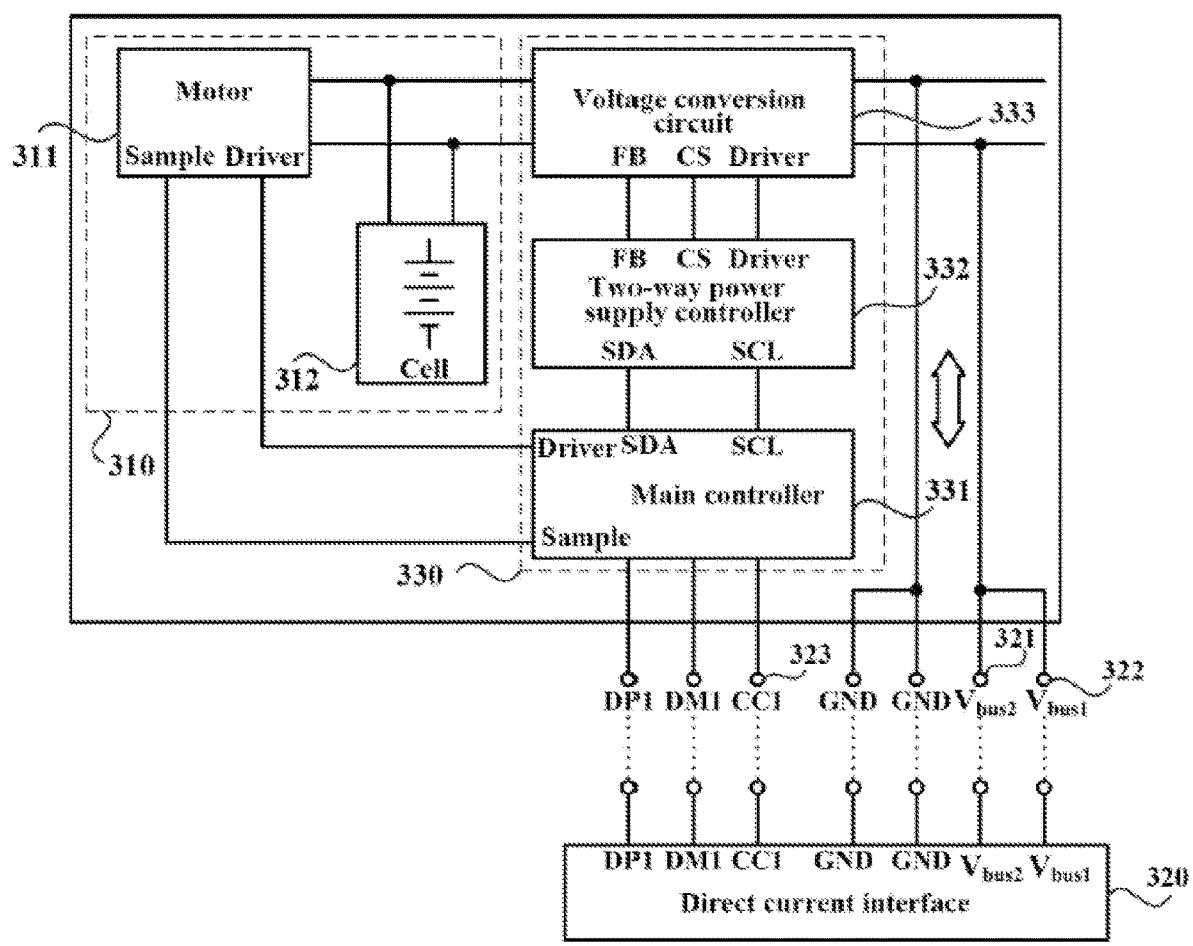
FIG. 25 is a circuit block diagram of the power tool in FIG. 24.

As shown in FIG. 24, a power tool 300 in another example of the present application is provided. Referring to FIG. 25, the power tool 300 includes a power module, an output unit, a cell 312, a direct current interface 320, and a two-way control module 330.

As shown in FIG. 24, the power tool 300 is a hand-held power tool such as an electric drill, a screwdriver, a nail gun, a wrench, and an angle grinder. Although this example relates to a hand-held power tool, it is to be understood that the present application is not limited to the disclosed example and can be applied to other types of power tools, including but not limited to garden power tools such as a vehicle-type lawn mower and home products such as a hair dryer.

Referring to FIG. 25, the power module includes a motor 311 and the cell 312. The motor 311 may be powered by the cell 312 or an external power supply device. The motor 311 is configured to drive the output unit to output power to an outside. For example, in the case where the power tool is the screwdriver, an output mechanism is an output shaft driven by the motor.

The cell 312 is configured to store power and can be repeatedly charged and discharged; the cell 312 may be a lithium-ion battery or a graphene battery.

The direct current interface 320 is configured to be capable of being selectively connected to an external power consumption device or an external power supply device. In the case where the direct current interface 320 is in a charge state, electric power from the external power supply device is received; and in the case where the direct current interface 320 is in a discharge state, electric power of the cell 312 is supplied to the external power consumption device.

Referring to FIG. 25, the direct current interface 320 includes a detection terminal 323 and an electric power terminal, where the electric power terminal is configured to output or input electric power. The electric power terminal of the direct current interface 320 includes at least two power positive terminals. Two power positive terminals are a first electric power terminal 321 and a second electric power terminal 322, respectively, such as Vbus1 and Vbus2. The first electric power terminal 321 and the second electric power terminal 322 can be connected to a positive terminal of the external power consumption device or a positive terminal of the external power supply device and are configured to input or output electric power.

The output or input power of the direct current interface is P, where $P \leq 100$ W; or $100\ W \leq P \leq 200$ W; or $200\ W \leq P \leq 500$ W.

The output or input voltage of the direct current interface is U, where $U \leq 20$ V; or $20\ V \leq U \leq 60$ V; or $60\ V \leq U \leq 100V$.

The direct current interface 320 further includes the detection terminal 323 such as CC1; the detection terminal 323 detects a state signal of the direct current interface 320. The detection terminal 323 is configured to detect the state signal of the direct current interface 320, where the direct current interface 320 has the charge state, the discharge state, and an empty state.

Specifically, in the case where the direct current interface 320 is connected to the external power supply device, the detection terminal 323 detects a high level, the external power supply device is equivalent to a pull-up resistor, it is determined that the direct current interface 320 is a power supply side, the cell 312 is equivalent to a pull-down resistor and determined as a power receiving side, and the detection terminal 323 determines that the direct current interface 320 is in the charge state and sends a charge control signal to the two-way control module 330 so that the external power supply device charges the cell 312.

In the case where the direct current interface 320 is connected to the external power consumption device, the detection terminal 323 detects a low level, the external power consumption device is equivalent to a pull-down resistor, it is determined that the direct current interface 320 is a power receiving side, the cell 312 is equivalent to a pull-up resistor and determined as a power supply side, and the detection terminal 323 determines that the direct current interface 320 is in the discharge state and sends a discharge control signal to the two-way control module 330 so that the cell 312 is discharged to supply power to the external power consumption device.

The two-way control module 330 is connected in series between the power module 310 and the direct current interface 320, where the two-way control module is configured to adjust electric power of the external power supply device according to a control signal of the direct current interface 320 to form an electric power input adapted to the cell 312 so that the external power supply device charges the cell 312; or the two-way control module is configured to adjust the electric power of the external power supply device according to a signal of the motor 311 to form an electric power input adapted to the motor 311 so that the external power supply device supplies power to the motor 311; the two-way control module 330 may also be configured to match a discharge voltage of the cell 312 with a power supply voltage required by the external power consumption device according to the control signal of the direct current interface 320 so that the external power consumption device is powered.

As a specific example, the two-way control module may be one circuit board or may be integrated by multiple circuit boards, which is not limited herein. The two-way control module in the present application includes a main controller 331, a two-way power supply controller 332, and a voltage conversion circuit 333 that are disposed on a circuit board.

Specifically, in the case where the direct current interface 320 is connected to the external power supply device, the detection terminal 323 detects a charge signal and determines that the direct current interface 320 is in the charge state, and the detection terminal 232 sends the charge control signal to the main controller 331. The main controller 331 outputs a control signal to the two-way power supply controller 332 according to the charge control signal; the two-way power supply controller 332 receives the control signal from the main controller 331 and outputs a power supply control signal to the voltage conversion circuit 333 to control a current direction of the voltage conversion circuit 333 and control the voltage conversion circuit 333 to adjust the electric power of the external power supply device to form an electric power output adapted to the cell 312 or the motor 311 so that the external power supply device supplies power to the cell 312 or the motor 311.

It is to be understood that the main controller 331 further includes a communication terminal communicatively connected to the motor, and the main controller 331 can receive a communication signal from the motor 311 to send power supply information adapted to the motor 311 to the main controller 331, such as voltage and current information; the main controller 331 sends the control signal to the two-way power supply controller 332 according to the power supply information, and finally, the two-way power supply controller 332 outputs the power supply control signal to the voltage conversion circuit 333 to adjust electric power input by the external power supply device to the motor 311.

In the case where the direct current interface 320 is connected to the external power consumption device, the detection terminal 323 detects a discharge signal and determines that the direct current interface 320 is in the discharge state, the detection terminal 323 sends the discharge control signal to the main controller 331, and the main controller 331 outputs the control signal to the two-way power supply controller 332 according to the discharge control signal. The two-way power supply controller 332 receives the control signal and controls the current direction of the voltage conversion circuit 333, and the voltage conversion circuit 333 matches the discharge voltage of the cell 312 with the power supply voltage required by the external power consumption device so that the external power consumption device is powered.

In this manner, an external power supply device of a smartphone or a laptop available on site may be used to charge the battery pack 100 through the direct current interface, and the battery pack 100 may also output the electric power stored in the cell to supply power to an external power consumption device such as the smartphone or the laptop. It is to be understood that the power supply includes a case where electric power is directly supplied to the external power consumption device for its use and a case where the external power consumption device is charged.

It is to be understood that the power tool may be connected to the external power supply device or the external power consumption device through an adapter, and the adapter can make the battery pack output electric power and can also supply electric power to charge the power tool and/or the cell. As shown in FIG. 24, the adapter may include a power plug and an output interface; of course, the adapter may also include an input interface and an output interface that are configured to be connected to the power tool and the external power supply device or the external power consumption device, respectively.

An operation process of the power tool in the present application is described below.

A: the case where the direct current interface 320 is connected to the external power supply device.

The main controller 331 receives a signal from the communication terminal of the motor 311, the external power supply device supplies power to the motor 311 through the two-way control module, and the external power supply device may also charge the cell 312 through the two-way control module 330. For a process of supplying power to the cell or the motor by the external power supply device, reference may be made to the preceding related description, which is not repeated herein.

Of course, in the case where the direct current interface 320 is connected to the external power supply device, the external power supply device may be configured to only supply power to the motor or only charge the cell. The preceding configuration may be implemented by a predetermined program set on the main controller 331.

B: the case where the direct current interface is connected to the external power consumption device.

In this case, the cell 312 supplies power to the external power consumption device through the two-way control module 330; and the cell 312 may also supply power to the motor, and the power tool 300 can operate normally.

C: the case where no device is connected to the direct current interface.

In this case, the cell 312 supplies power to the motor 311, and the power tool can operate normally

What is claimed is:

1. A combination, comprising:
  a battery pack;
  a first adapter; and
  a second adapter;
  wherein the battery pack comprises a battery pack interface at least capable of being detachably connected to a power tool;
  wherein the first adapter comprises a plug for access to an alternating current, an alternating current input interface electrically connected to the plug, an alternating current-direct current conversion circuit electrically connected to the alternating current input interface and configured to convert the alternating current into a direct current, and a direct current output interface electrically connected to the alternating current-direct current conversion circuit and configured to output the direct current;
  wherein the second adapter is capable of being electrically connected to the first adapter and the battery pack, is capable of charging the battery pack with a charging power greater than 10 W, and comprises an adapter interface configured to be detachably connected to the battery pack interface, a direct current interface configured to be detachably electrically connected to the direct current output interface, a voltage conversion circuit connected in series between the direct current interface and the adapter interface and configured to convert the direct current into an electric power output adapted to the battery pack, and a two-way control module connected between the direct current interface and the adapter interface and connected to the voltage conversion circuit; and
  wherein the two-way control module is configured to be capable of controlling a current direction and an output voltage of the voltage conversion circuit according to a signal state of the direct current interface and a signal state of the adapter interface so that the direct current interface is capable of being connected to the first adapter to receive power and is also capable of being connected to an external power consumption device to output power.

2. The combination of claim 1, wherein the direct current interface comprises at least two power positive terminals and the at least two power positive terminals are connected to a positive electrode of the direct current.

3. The combination of claim 1, wherein, in a case where the direct current interface is electrically connected to the direct current output interface, the direct current output interface is capable of outputting electric power within a voltage range of 5 V to 20 V.

4. The combination of claim 1, wherein a nominal voltage range of the battery pack is 10 V to 120 V.

5. The combination of claim 1, wherein the battery pack comprises a guide groove configured to be slidably connected to the second adapter and the adapter interface comprises an electrical connection terminal electrically connected to the battery pack terminal and a guide rail configured to fit with the guide groove so that the battery pack is slidably connected to the second adapter.

6. The combination of claim 1, wherein the signal state of the direct current interface comprises a charge state and a discharge state.

7. The combination of claim 6, wherein the direct current interface comprises a detection terminal configured to detect the signal state of the direct current interface and, in a case where the direct current interface is connected to the direct current output interface and the detection terminal detects that the direct current interface is in the charge state, the detection terminal sends a charge control signal to the two-way control module so that the two-way control module controls the current direction of the voltage conversion circuit and thus the direct current charges the battery pack.

8. The combination of claim 6, wherein the direct current interface comprises a detection terminal configured to detect the signal state of the direct current interface and, in a case where the direct current interface is connected to an external power consumption device and the detection terminal detects that the direct current interface is in the discharge state, the detection terminal sends a discharge control signal to the two-way control module so that the two-way control module controls the current direction of the voltage conversion circuit and thus the battery pack is discharged to supply power to the external power consumption device.

9. The combination of claim 7, wherein the second adapter further comprises a communication module configured to be capable of receiving the charge control signal from the detection terminal and transmitting the charge control signal to the two-way control module, the two-way control module comprises a main controller configured to be capable of receiving a communication signal about battery pack information from the battery pack and transmitting the communication signal of the battery pack information to the communication module, and the communication module is configured to receive the communication signal of the battery pack information and adjust a voltage, current, and power of the direct current so that the battery pack is charged.

10. The combination of claim 9, wherein the two-way control module further comprises a two-way power supply controller, the main controller is further configured to be capable of receiving the charge control signal and outputting a control signal to the two-way power supply controller, and the two-way power supply controller is configured to output a power supply control signal to the voltage conversion circuit according to the control signal from the main controller to control the current direction of the voltage conversion circuit and control the voltage conversion circuit to adjust the direct current to form the electric power output adapted to the battery pack so that the direct current charges the battery pack.

11. The combination of claim 7, wherein, in a case where the detection terminal detects a high level, it is determined that the direct current interface is in the charge state.

12. The combination of claim 7, wherein, in a case where the detection terminal detects a low level, it is determined that the direct current interface is in the discharge state.

13. An adapter, comprising:
an adapter interface configured to be connected to a battery pack capable of being detachably connected to a power tool; and
a direct current interface configured to be capable of being selectively connected to an external power consumption device or an external power supply device, wherein an output or input power of the direct current interface is greater than 10 W;
wherein the adapter further comprises a voltage conversion circuit, a communication module, a main controller, and a two-way power supply controller, the voltage conversion circuit is connected in series between the direct current interface and the adapter interface, the voltage conversion circuit is configured to convert electric power of the external power supply device into an electric power output adapted to the battery pack or to convert electric power of the battery pack into an electric power output adapted to the external power consumption device, the communication module is configured to be capable of sending a control signal to the main controller according to a signal state of the direct current interface, the main controller is connected between the direct current interface and the adapter interface, the two-way power supply controller is connected between the main controller and the voltage conversion circuit, and the main controller is configured to control a current direction and an output voltage of the voltage conversion circuit according to the signal state of the direct current interface and a signal state of the adapter interface so that the external power supply device charges the battery pack through the direct current interface or the battery pack is discharged to supply power to the external power consumption device through the direct current interface;
wherein the direct current interface is capable of being connected to the external power supply device to receive power and is also capable of being connected to an external power consumption device to output power.

14. The adapter of claim 13, wherein the direct current interface comprises at least two power positive terminals and the at least two power positive terminals are connected to a positive electrode of the external power consumption device or a positive electrode of the external power supply device.

15. The adapter of claim 13, wherein a value range of an output or input voltage of the direct current interface is 5 V to 20 V.

16. An adapter, comprising:
an adapter interface configured to be connected to a battery pack capable of being detachably connected to a power tool;
a first direct current interface configured to be capable of being electrically connected to an external power supply device;
a second direct current interface capable of being electrically connected to an external power consumption device and configured to supply electric power of the external power supply device or electric power of the battery pack to the external power consumption device;
a first voltage conversion circuit connected in series between the first direct current interface and the adapter interface and configured to convert the electric power of the external power supply device into an electric power output adapted to the battery pack; and
a two-way control module connected between the first direct current interface and the adapter interface and connected to the first voltage conversion circuit;
wherein an input power of the first direct current interface is greater than 10 W and an input voltage range of the first direct current interface is 5 V to 20 V, the two-way control module is configured to be capable of controlling a current direction and an output voltage of the first voltage conversion circuit according to a signal state of the first direct current interface and a signal state of the adapter interface so that the first direct current interface is capable of being connected to the external power supply device to receive power and is also capable of being connected to the external power consumption device to output power, in a case where the first direct current interface is connected to the external power supply device and the second direct current interface is connected to the external power consumption device, the external power supply device is capable of charging the battery pack through the first direct current interface, and the external power supply device is capable of charging the external power consumption device through the second direct current interface.

17. The adapter of claim 16, wherein the first direct current interface comprises at least two power positive terminals, the at least two power positive terminals are connected to a positive electrode of the external power supply device, the second direct current interface comprises at least two power positive terminals, and the at least two power positive terminals are connected to a positive electrode of the external power consumption device.

18. The adapter of claim 16, wherein the signal state of the first direct current interface comprises a charge state and a discharge state.

19. The adapter of claim 18, wherein the first direct current interface comprises a detection terminal configured to detect the signal state of the first direct current interface and, in a case where the first direct current interface is connected to the external power supply device and the detection terminal detects that the first direct current interface is in the charge state, the detection terminal sends a charge control signal to the two-way control module so that the two-way control module controls the current direction of the first voltage conversion circuit and thus the external power supply device charges the battery pack.

20. The adapter of claim 18, wherein the first direct current interface comprises a detection terminal configured to detect the signal state of the first direct current interface and, in a case where the first direct current interface is connected to the external power consumption device and the detection terminal detects that the first direct current interface is in the discharge state, the detection terminal sends a discharge control signal to the two-way control module so that the two-way control module controls the current direction of the first voltage conversion circuit and thus the battery pack is discharged to supply power to the external power consumption device.

* * * * *